US009003920B2

(12) United States Patent
Nagahori et al.

(10) Patent No.: US 9,003,920 B2
(45) Date of Patent: Apr. 14, 2015

(54) PEDAL ARM, MANUFACTURING APPARATUS THEREOF, AND MANUFACTURING METHOD THEREOF

(75) Inventors: Katsumi Nagahori, Tochigi (JP); Tohru Izu, Tochigi (JP); Shuichi Inoue, Tochigi (JP); Takanori Matsumura, Kuki (JP)

(73) Assignee: F-Tech Inc., Kuki (JP)

( * ) Notice: Subject to any disclaimer, the term of this patent is extended or adjusted under 35 U.S.C. 154(b) by 807 days.

(21) Appl. No.: 13/089,439

(22) Filed: Apr. 19, 2011

(65) Prior Publication Data

US 2011/0252919 A1 Oct. 20, 2011

(30) Foreign Application Priority Data

Apr. 20, 2010 (JP) .................................. 2010-097337

(51) Int. Cl.
| | |
|---|---|
| *G05G 1/50* | (2008.04) |
| *G05G 1/44* | (2008.04) |
| *B60T 7/06* | (2006.01) |
| *B21D 53/88* | (2006.01) |

(52) U.S. Cl.
CPC . *B60T 7/06* (2013.01); *B21D 53/88* (2013.01); *G05G 1/50* (2013.01); *G05G 1/506* (2013.01)

(58) Field of Classification Search
CPC ........... G05G 1/50; G05G 1/445; G05G 1/44; G05G 1/30; B60T 7/04; B60T 7/06; B60K 26/02; B60K 26/00
USPC .......................... 74/512–514, 560, 562, 562.5
See application file for complete search history.

(56) References Cited

U.S. PATENT DOCUMENTS

| | | | | | |
|---|---|---|---|---|---|
| 5,435,205 | A | * | 7/1995 | Seksaria et al. | 74/560 |
| 6,513,407 | B1 | * | 2/2003 | Higgins | 74/560 |
| 2001/0015112 | A1 | * | 8/2001 | Popowich | 74/560 |
| 2001/0032488 | A1 | | 10/2001 | Millman et al. | |
| 2002/0023516 | A1 | * | 2/2002 | Frobel et al. | 74/512 |
| 2002/0174739 | A1 | * | 11/2002 | Cordero | 74/560 |
| 2010/0058887 | A1 | * | 3/2010 | Fujita et al. | 74/512 |
| 2010/0180717 | A1 | * | 7/2010 | Himetani | 74/560 |
| 2010/0307284 | A1 | * | 12/2010 | Himetani et al. | 74/560 |
| 2011/0094329 | A1 | * | 4/2011 | Himetani | 74/512 |

FOREIGN PATENT DOCUMENTS

| | | | | |
|---|---|---|---|---|
| DE | 10162682 | A1 | * | 7/2003 |
| DE | 102005051144 | B3 | * | 4/2007 |
| EP | 2128737 | A1 | * | 12/2009 |
| FR | 2523742 | A1 | * | 8/1983 |
| JP | 2001-287629 | A | | 10/2001 |
| WO | WO 2004031880 | A1 | * | 4/2004 |

* cited by examiner

*Primary Examiner* — Daniel Yabut
(74) *Attorney, Agent, or Firm* — Westerman, Hattori, Daniels & Adrian, LLP

(57) ABSTRACT

A pedal arm provided with an arm main body has a first end portion, a second end portion, a pedal pad portion, and a shaft portion. The arm main body includes a first wall portion and a second wall portion in a first direction, and a third wall portion and a fourth wall portion in a second direction. One of the first wall portion and the second wall portion includes an abutting portion where the first end portion and the second end portion contacts, and the third wall portion and the fourth wall portion include a first curved portion and a second curved portion. A first depressed wall portion and a second depressed wall portion are formed on the first curved portion and the second curved portion, which are formed in inward convex shapes, respectively, and parts of the first depressed wall portion and the second depressed wall portion contact.

7 Claims, 19 Drawing Sheets

PEDAL ARM, MANUFACTURING APPARATUS THEREOF, AND MANUFACTURING METHOD THEREOF

BACKGROUND OF THE INVENTION

The present invention relates to a pedal arm, a manufacturing apparatus thereof, and a manufacturing method thereof, and, more particularly, relates to a pedal arm that is formed in a tubular shape by bending a plate and an apparatus and method for manufacturing the pedal arm.

In recent years, there have been various demands on a pedal arm such as a brake pedal of a vehicle such as a motor vehicle, which have a tradeoff relation with one another, such as ensuring strength in a necessary and sufficient manner while simplifying its structure and enhancing designing flexibility of its shape.

Under such a situation, Japanese Patent Application Laid-open Publication No. 2001-287629 discloses a method of manufacturing a brake pedal main body for a motor vehicle, which is formed in a flattened tubular shape, and, more particularly, proposes a method of obtaining a frusto-conical tube, bending the frusto-conical tube into a predetermined shape, and then flattening at least a portion of the bent frusto-conical tube.

SUMMARY OF THE INVENTION

Upon studies conducted by the present inventors, however, in Japanese Patent Application Laid-open Publication No. 2001-287629 mentioned above, no actual technique is disclosed on a specific configuration for manufacturing a tubular-shaped brake pedal main body for a motor vehicle with high accuracy. Therefore, in such a patent document, there is room for consideration in terms of realizing a simplified structure with which it is possible to maintain high shape accuracy in a stable manner at the time of mass production of the tubular-shaped brake pedal main body.

In addition, it is often necessary for the tubular-shaped brake pedal main body of the motor vehicle to fix a collar thereto for achieving a connection to another member. However, in this case, it is cumbersome to fix the collar to the tubular-shaped brake pedal main body of the motor vehicle through welding, which tends to affect the strength and shape accuracy. Therefore, there is another demand for realizing a simplified structure with which it is possible to fix the collar to the tubular-shaped brake pedal main body of the motor vehicle without using welding.

The present invention has been completed with the above view in mind, and it is an object of the present invention to provide a pedal arm and an apparatus and method of manufacturing it, with a simplified structure with which it is possible to maintain high shape accuracy in a stable manner at the time of mass production of the pedal arm while ensuring its strength in a necessary and sufficient manner and enhancing designing flexibility of its shape. It is another object of the present invention to provide a pedal arm and an apparatus and method of manufacturing it, with a simplified structure with which it is possible to fix a collar to the pedal arm without using welding.

To achieve the above objects, a first aspect of the present invention provides a pedal arm comprising an arm main body that is a tubular-shaped member formed by bending a plate member having a first end portion and a second end portion, a pedal pad portion provided on the arm main body, and a shaft portion provided on the arm main body. The arm main body includes a first wall portion and a second wall portion facing each other in a first direction, and a third wall portion and a fourth wall portion facing each other in a second direction that is different from the first direction. One of the first wall portion and the second wall portion includes an abutting portion at which the first end portion and the second end portion of the plate member are brought into contact with each other, and the third wall portion and the fourth wall portion correspondingly include a first curved portion and a second curved portion, which are curved in parallel to each other with a same curvature along an extending direction of the arm main body. A first depressed wall portion and a second depressed wall portion are correspondingly formed on the first curved portion and the second curved portion, which are formed in inward convex shapes, respectively, and at least parts of the first depressed wall portion and the second depressed wall portion are brought into contact with each other.

A second aspect of the present invention provides the pedal arm according to the first aspect, wherein the first depressed wall portion includes a flat portion that extends to form the first curved portion in the middle thereof, and the second depressed wall portion includes a flat portion that extends to form the second curved portion in the middle thereof.

A third aspect of the present invention provides the pedal arm according to the first or second aspect, wherein the first depressed wall portion and the second depressed wall portion include respective bead portions, and the first depressed wall portion and the second depressed wall portion are brought into contact with each other at the respective bead portions.

A fourth aspect of the present invention provides the pedal arm according to the first or second aspect, wherein a bottom wall portion of the first depressed wall portion and a bottom wall portion of the second depressed wall portion are entirely brought into contact with each other.

A fifth aspect of the present invention provides the pedal arm according to any one of the first to fourth aspects, wherein the third wall portion and the fourth wall portion further correspondingly includes a third curved portion and a fourth curved portion that curve in parallel to each other with a same curvature in a direction opposite to a direction in which the first curved portion and the second curved portion curve along the extending direction of the arm main body, and wherein a third depressed wall portion and a fourth depressed wall portion are formed on the third curved portion and the fourth curved portion, which are formed in inward convex shapes, respectively, and at least parts of the third depressed wall portion and the fourth depressed wall portion are brought into contact with each other.

A sixth aspect of the present invention provides the pedal arm according to any one of the first to fifth aspects, wherein there is further provided a collar, and the collar includes a first convex portion having a diameter expanded in a radial direction thereof by a deformation of the collar, and the collar is fixed to the arm main body with the first convex portion.

A seventh aspect of the present invention provides the pedal arm according to the sixth aspect, wherein the collar further includes a pair of flange portions, and the collar is fixed to the third wall portion and the fourth wall portion with the first convex portion and the pair of flange portions.

An eighth aspect of the present invention provides the pedal arm according to the sixth aspect, wherein the collar further includes a second convex portion having a diameter expanded in the radial direction thereof by a deformation of the collar, and the collar is fixed to the third wall portion and the fourth wall portion with the first convex portion and the second convex portion.

A ninth aspect of the present invention provides the pedal arm according to the sixth aspect, wherein the collar further includes a pressing portion at which the collar is pressed in the radial direction thereof, and the collar is fixed to the third wall portion and the fourth wall portion with the first convex portion and the pressing portion.

A tenth aspect of the present invention provides an apparatus of manufacturing a pedal arm including an arm main body that is a tubular-shaped member formed by bending a plate member having a first end portion and a second end portion, a pedal pad portion provided on the arm main body, and a shaft portion provided on the arm main body. The apparatus includes a mold structure for forming a first wall portion and a second wall portion, in the tubular-shaped member, facing each other in a first direction in such a manner that one of the first wall portion and the second wall portion includes an abutting portion at which the first end portion and the second end portion of the plate member are brought into contact with each other, and a mold structure for forming a third wall portion and a fourth wall portion, in the tubular-shaped member, facing each other in a second direction that is different from the first direction in such a manner that the third wall portion and the fourth wall portion include a pair of curved portions curved in parallel to each other with a same curvature along an extending direction of the arm main body, and at least parts of the pair of curved portions are brought into contact with each other.

An eleventh aspect of the present invention provides a method of manufacturing a pedal arm, the method including a step of forming an arm main body that is a tubular-shaped member by bending a plate member having a first end portion and a second end portion, a step of providing a pedal pad portion on the arm main body, and a step of providing a shaft portion on the arm main body. The step of forming the arm main body includes forming a first wall portion and a second wall portion, in the tubular-shaped member, facing each other in a first direction in such a manner that one of the first wall portion and the second wall portion includes an abutting portion at which the first end portion and the second end portion of the plate member are brought into contact with each other and, thereafter, forming a third wall portion and a fourth wall portion, in the tubular-shaped member, facing each other in a second direction that is different from the first direction in such a manner that the third wall portion and the fourth wall portion include a pair of curved portions curved in parallel to each other with a same curvature along an extending direction of the arm main body, and at least parts of the pair of curved portions are brought into contact with each other.

According to the configuration of the first aspect of the present invention, the arm main body includes the first wall portion and the second wall portion facing each other in the first direction, and the third wall portion and the fourth wall portion facing each other in the second direction that is different from the first direction. Here, one of the first wall portion and the second wall portion includes the abutting portion at which the first end portion and the second end portion of the plate member are brought into contact with each other, and the third wall portion and the fourth wall portion correspondingly include the first curved portion and the second curved portion, which are curved in parallel to each other with the same curvature along the extending direction of the arm main body. Also, the first depressed wall portion and the second depressed wall portion are correspondingly formed on the first curved portion and the second curved portion, which are formed in inward convex shapes, respectively, and at least parts of the first depressed wall portion and the second depressed wall portion are brought into contact with each other. Therefore, it is possible to provide the pedal arm with a simplified structure while maintaining high shape accuracy in a stable manner at the time of mass production thereof and while ensuring its strength in a necessary and sufficient manner and enhancing designing flexibility of its shape.

According to the configuration of the second aspect of the present invention, because the first depressed wall portion includes the flat portion that extends to form the first curved portion in the middle thereof, and the second depressed wall portion includes the flat portion that extends to form the second curved portion in the middle thereof, the flat portions adjacent to the curved portions can be held when forming the curved portions. Therefore, it is possible to provide the pedal arm with a simplified structure with which high shape accuracy can be maintained in a stable manner at the time of mass production thereof.

According to the configuration of the third aspect of the present invention, because the first depressed wall portion and the second depressed wall portion include respective bead portions, and the first depressed wall portion and the second depressed wall portion are brought into contact with each other at the respective bead portions, the arm main body can be formed while positioning portions at which the curved portions are formed in a simple and secured manner by bringing the portions into contact with each other when forming the curved portions. Therefore, it is possible to provide the pedal arm with a simplified structure with which high shape accuracy can be maintained in a stable manner at the time of mass production thereof while enhancing the strength.

According to the configuration of the fourth aspect of the present invention, because the bottom wall portion of the first depressed wall portion and the bottom wall portion of the second depressed wall portion are entirely brought into contact with each other, the arm main body can be formed while positioning portions at which the curved portions are formed in a simple and secured manner by bringing the portions into contact with each other when forming the curved portions. Therefore, it is possible to provide the pedal arm with a simplified structure with which high shape accuracy can be maintained in a stable manner at the time of mass production thereof while enhancing the strength.

According to the configuration of the fifth aspect of the present invention, because the third wall portion and the fourth wall portion further correspondingly includes a third curved portion and a fourth curved portion that curve in parallel to each other with a same curvature in a direction opposite to a direction in which the first curved portion and the second curved portion curve along the extending direction of the arm main body, and, also, a third depressed wall portion and a fourth depressed wall portion are formed on the third curved portion and the fourth curved portion, which are formed in inward convex shapes, respectively, and at least parts of the third depressed wall portion and the fourth depressed wall portion are brought into contact with each other, it is possible to provide the pedal arm having a plurality of curved portions with a simplified structure with which it is possible to maintain high shape accuracy at the time of mass production thereof.

According to the configuration of the sixth aspect of the present invention, because the collar includes the first convex portion having the diameter expanded in the radial direction thereof by the deformation of the collar, and the collar is prevented from dropping out and fixed to the arm main body with the first convex portion, it is possible to provide the pedal arm with a simplified structure in which the collar is fixed to the pedal arm without using welding.

According to the configuration of the seventh aspect of the present invention, because the collar further includes the pair of flange portions, and the collar is fixed to the third wall portion and the fourth wall portion with the first convex portion and the pair of flange portions, even when a distance between the third wall portion and the fourth wall portion is wide, it is possible to provide the pedal arm with a simplified structure in which the collar is fixed to the pedal arm in a secured manner without using welding.

According to the configuration of the eighth aspect of the present invention, because the collar further includes the second convex portion having the diameter expanded in the radial direction thereof by the deformation of the collar, and the collar is prevented from dropping out and fixed to the third wall portion and the fourth wall portion with the first convex portion and the second convex portion, even when a distance between the third wall portion and the fourth wall portion is wide, it is possible to provide the pedal arm with a simplified structure in which the collar is fixed to the pedal arm in a secured manner without using welding.

According to the configuration of the ninth aspect of the present invention, because the collar further includes the pressing portion at which the collar is pressed in the radial direction thereof, and, the collar is prevented from dropping out and fixed while being pressed on the third wall portion and the fourth wall portion by using the first convex portion and the pressing portion, even when a distance between the third wall portion and the fourth wall portion is wide, it is possible to provide the pedal arm with a simplified structure in which the collar is fixed to the pedal arm in a secured manner without using welding.

According to the configurations of the tenth and eleventh aspects of the present invention, it is possible to provide the pedal arm with a simplified structure with which it is possible to maintain high shape accuracy in a stable manner at the time of mass production thereof while ensuring its strength in a necessary and sufficient manner and enhancing the designing flexibility of its shape.

DETAILED DESCRIPTION OF THE PREFERRED EMBODIMENTS

Figure 1:
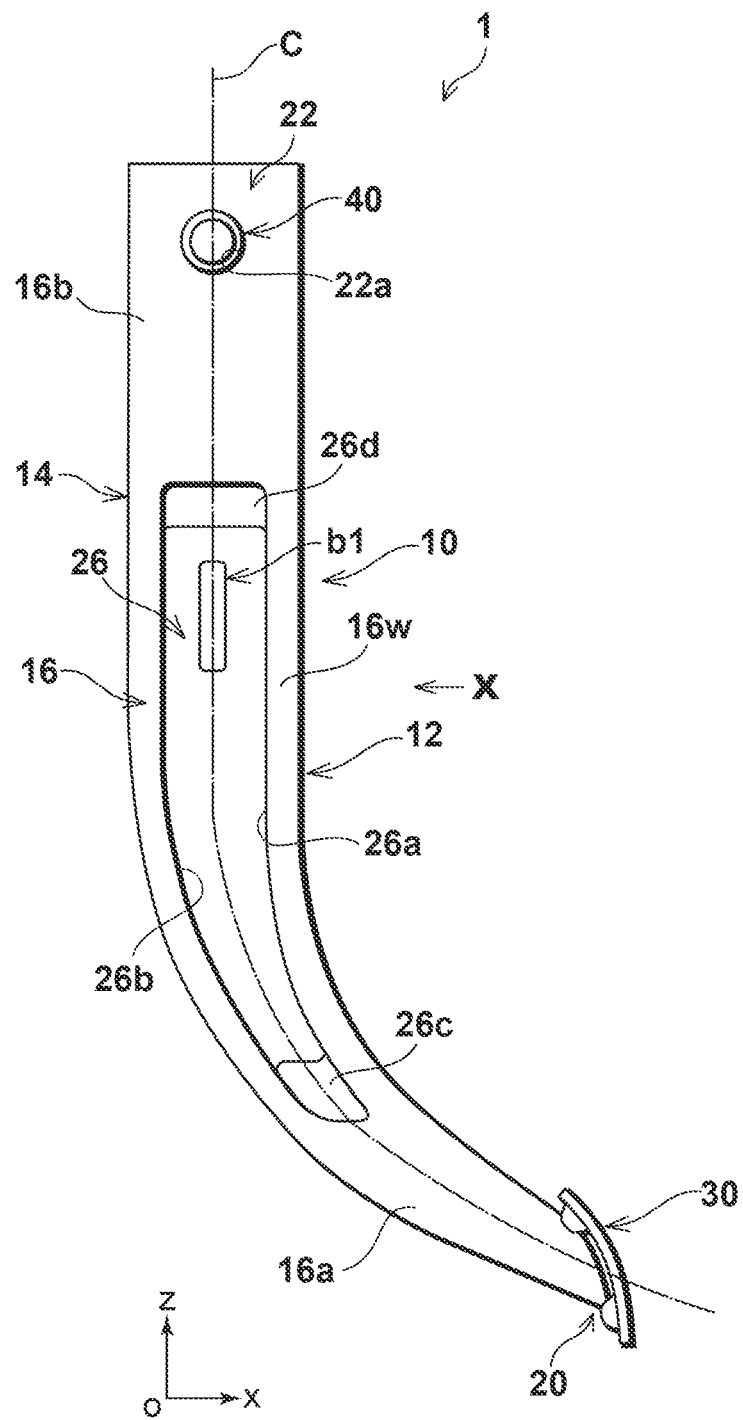
FIG. 1 is a side view of a pedal arm of a first embodiment according to the present invention.

Now, pedal arms, manufacturing apparatuses thereof, and manufacturing methods of respective embodiments according to the present invention will be described below in detail with reference to the accompanying drawings. Throughout the drawings, an x-axis, a y-axis, and a z-axis represent a three-axis orthogonal coordinate system. A direction of the y-axis denotes the horizontal direction and a direction of the z-axis denotes the vertical direction. In the drawings showing respective mold structures, the direction of the y-axis denotes the vertical direction for the convenience of explanation.

First Embodiment

First, a pedal arm of a first embodiment according to the present invention is described in detail with reference to FIGS. 1 to 3B.

Figure 2:
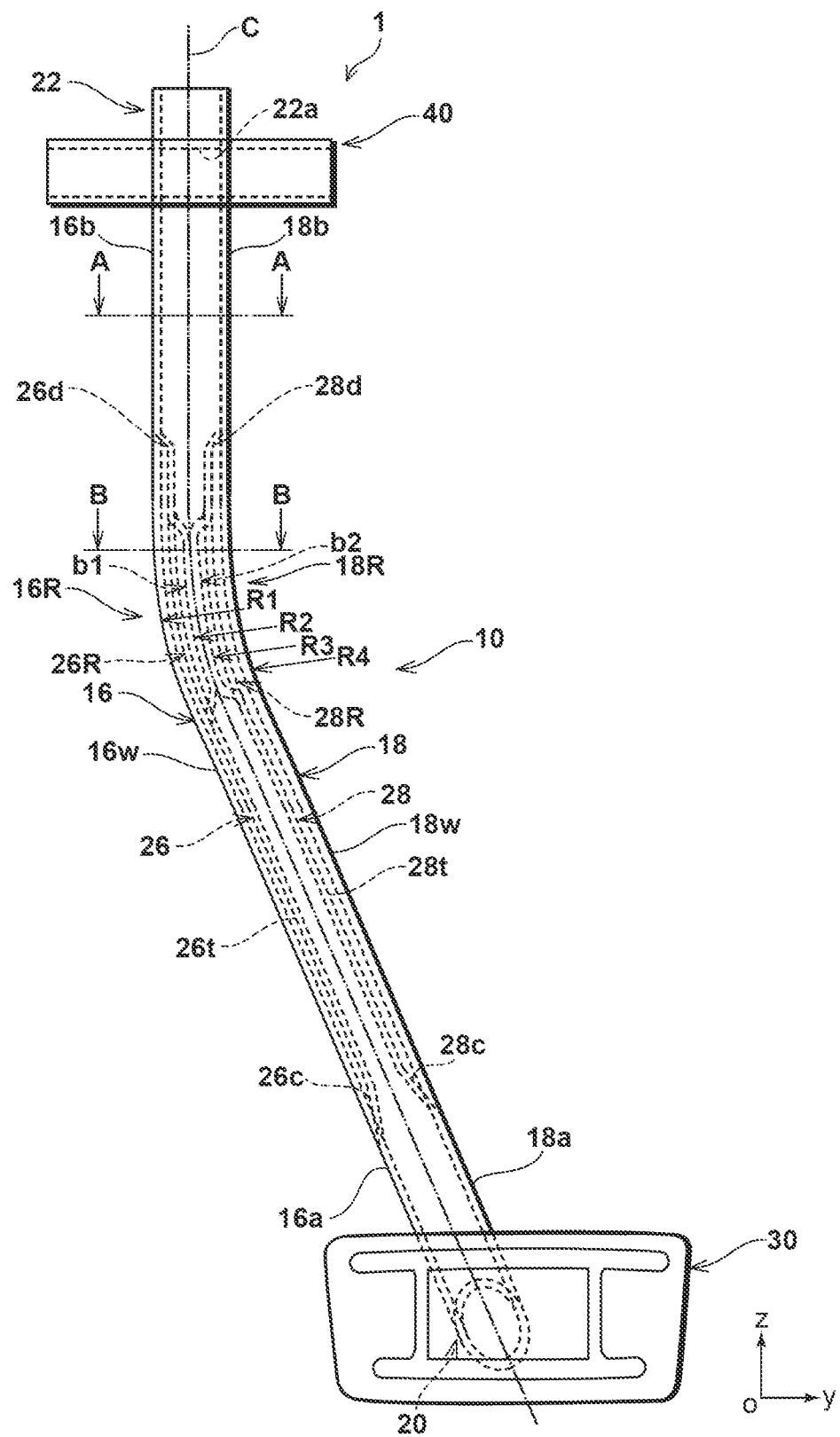
FIG. 2 is a front view of the pedal arm of the present embodiment, viewed in a direction of an arrow X shown in FIG. 1.
Figure 3A:
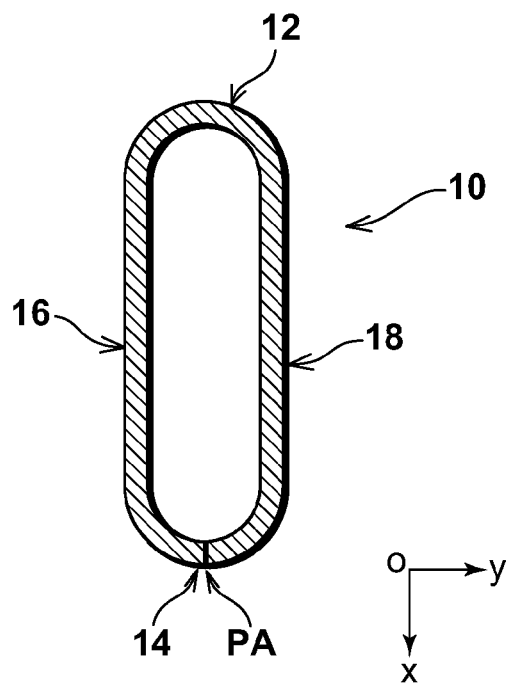
FIG. 3A is an enlarged cross-sectional view of the pedal arm of the present embodiment, which is an enlarged cross-sectional view along a line A-A shown in FIG. 2.
Figure 3B:
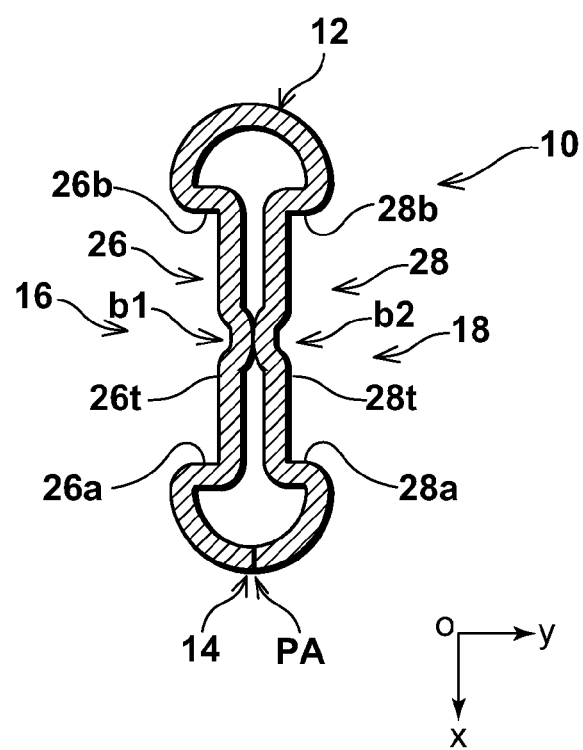
FIG. 3B is an enlarged cross-sectional view of the pedal arm of the present embodiment, which is an enlarged cross-sectional view along a line B-B shown in FIG. 2.

FIG. 1 is a side view of a pedal arm of the present embodiment. FIG. 2 is a front view of the pedal arm of the present embodiment, viewed in a direction of an arrow X shown in FIG. 1. FIGS. 3A and 3B are enlarged cross-sectional views of the pedal arm of the present embodiment, where FIG. 3A shows an enlarged cross-sectional view along a line A-A shown in FIG. 2, and FIG. 3B shows an enlarged cross-sectional view along a line B-B shown in FIG. 2.

In the illustrated embodiment, as is clear from FIGS. 1 to 3A and 3B, a pedal arm 1, which extends in the direction of the z-axis and is typically applied to a brake arm of a vehicle such as a motor vehicle, includes an arm main body 10 that is a tubular-shaped member formed by bending a plate member in a tubular shape, a pedal pad portion 30 that is mounted on a lower end portion 20 of the arm main body 10 in a fixed manner, and a shaft portion 40 that is fixed being inserted in a hole 22a provided at an upper end portion 22 of the arm main body 10. As shown with respect to a center axis C, the pedal arm 1 is curved toward a positive direction of the x-axis and, also, toward a positive direction of the y-axis. The arm main body 10, the pedal pad portion 30, and the shaft portion 40 are typically made of metal such as iron alloy and aluminum alloy.

Specifically, the arm main body 10 includes a rear wall portion 12 and a front wall portion 14 facing each other in a direction of the x-axis and formed in such a manner that their cross-sectional shapes perpendicular to the center axis C are respectively curved outward in a convex arc shape, and a left wall portion 16 and a right wall portion 18 facing each other in the direction of the y-axis. The rear wall portion 12 and the front wall portion 14 are connected to each other via the left wall portion 16 and the right wall portion 18 in a continuous manner. The front wall portion 14 includes an abutting portion PA at which both end portions of a plate member that forms the arm main body 10 are brought into contact with each other. The left wall portion 16 includes a lower wall portion 16a and an upper wall portion 16b, each of which is a flat portion. The lower wall portion 16a and the upper wall portion 16b are connected to each other via a curved portion 16R that is curved to form a convex shape projected in a negative direction of the y-axis along the direction of the z-axis along which the arm main body 10 extends. The right wall portion 18 includes a lower wall portion 18a and an upper wall portion 18b, each of which is a flat portion. The lower wall portion 18a and the upper wall portion 18b are connected to each other via a curved portion 18R that is curved to form a convex shape projected in a negative direction of the y-axis along the direction of the z-axis along which the arm main body 10 extends.

The left wall portion 16 further includes a depressed wall portion 26 formed by depressing a part of a wall surface 16w of the left wall portion 16 in the positive direction of the y-axis. The depressed wall portion 26 includes a bottom wall portion 26t, a rear wall portion 26a, a front wall portion 26b, a lower inclined wall portion 26c, and an upper inclined wall portion 26d. The bottom wall portion 26t includes a flat portion parallel to the wall surface 16w of the left wall portion 16 and formed with a curved portion 26R in the middle of the flat portion. The rear wall portion 26a is formed on the positive direction side of the x-axis in the bottom wall portion 26t in such a manner that it is bent from the bottom wall portion 26t to stand up in the negative direction of the y-axis. The front wall portion 26b is formed on a negative direction side of the x-axis parallel to the rear wall portion 26a in such a manner that it is bent from the bottom wall portion 26t to stand up in the negative direction of the y-axis. The lower inclined wall portion 26c is formed on a negative direction side of the z-axis in such a manner that it is slanted from the bottom wall portion 26t to stand up in a direction crossing the x-y plane. The upper inclined wall portion 26d is formed on a positive direction side of the z-axis in such a manner that it is slanted from the bottom wall portion 26t to stand up in a direction crossing the x-y plane. In addition, the bottom wall portion 26t of the depressed wall portion 26 extends until a position of the lower wall portion 16a that is a flat portion, the rear wall portion 26a and the front wall portion 26b are bent from the lower inclined wall portion 26c to stand up at a position of the lower inclined wall portion 26c, and the lower inclined wall portion 26c connects the bottom wall portion 26t to the lower wall portion 16a therethrough. Similarly, the bottom wall portion 26t of the depressed wall portion 26 extends until a position of the upper wall portion 16b that is a flat portion, the rear wall portion 26a and the front wall portion 26b are bent from the upper inclined wall portion 26d to stand up at a position of the upper inclined wall portion 26d, and the upper inclined wall portion 26d connects the bottom wall portion 26t to the upper wall portion 16b therethrough.

Meanwhile, the right wall portion 18 further includes a depressed wall portion 28 that is formed by depressing a part of a wall surface 18w of the right wall portion 18 in the negative direction of the y-axis. The depressed wall portion 28 includes a bottom wall portion 28t, a rear wall portion 28a, a front wall portion 28b, a lower inclined wall portion 28c, and an upper inclined wall portion 28d. The bottom wall portion 28t includes a flat portion parallel to the wall surface 18w of the right wall portion 18 and formed with a curved portion 28R in the middle of the flat portion. The rear wall portion 28a is formed on the positive direction side of the x-axis in the bottom wall portion 28t in such a manner that it is bent from the bottom wall portion 28t to stand up in the positive direction of the y-axis. The front wall portion 28b is formed on a negative direction side of the x-axis parallel to the rear wall portion 28a in such a manner that it is bent from the bottom wall portion 28t to stand up in the positive direction of the y-axis. The lower inclined wall portion 28c is formed on the negative direction side of the z-axis in such a manner that it is slanted from the bottom wall portion 28t to stand up in a direction crossing the x-y plane. The upper inclined wall portion 28d is formed on the positive direction side of the z-axis in such a manner that it is slanted from the bottom wall portion 28t to stand up in a direction crossing the x-y plane. In addition, the bottom wall portion 28t of the depressed wall portion 28 extends until a position of the lower wall portion 18a that is a flat portion, the rear wall portion 28a and the front wall portion 28b are bent from the lower inclined wall portion 28c to stand up at a position of the lower inclined wall portion 28c, and the lower inclined wall portion 28c connects the bottom wall portion 28t to the lower wall portion 18a therethrough. Similarly, the bottom wall portion 28t of the depressed wall portion 28 extends until a position of the upper wall portion 18b that is a flat portion, the rear wall portion 28a and the front wall portion 28b are bent from the upper inclined wall portion 28d to stand up at a position of the upper inclined wall portion 28d, and the upper inclined wall portion 28d connects the bottom wall portion 28t to the upper wall portion 18b therethrough.

Here, a curved bead b1 is formed on the bottom wall portion 26t in the depressed wall portion 26 of the left wall portion 16 by further depressing a part of the bottom wall portion 26t in the positive direction of the y-axis, and a curved bead b2 is formed on the bottom wall portion 28t in the depressed wall portion 28 of the right wall portion 18 by further depressing a part of the bottom wall portion 28t in the negative direction of the y-axis. Specifically, the bottom wall portion 26t in the depressed wall portion 26 of the left wall portion 16 and the bottom wall portion 28t in the depressed wall portion 28 of the right wall portion 18 are brought into contact with each other at the curved bead b1 and the curved bead b2, while the rest portions of the bottom wall portion 26t and the bottom wall portion 28t other than the curved bead b1 and the curved bead b2 are not brought into contact with each other but substantially separated from each other by a predetermined distance. Furthermore, a position of a radius curvature end line at a lower end of the curved portion 16R of the left wall portion 16 is located at a position substantially matching a lower end of the curved bead b1 or a position upper than the lower end of the curved bead b1, and a position of a radius curvature end line at an upper end of the curved portion 16R of the left wall portion 16 is located at a position substantially matching an upper end of the curved bead b1 or a position lower than the upper end of the curved bead b1. Similarly, a position of a radius curvature end line at a lower end of the curved portion 18R of the right wall portion 18 is located at a position substantially matching a lower end of the curved bead b2 or a position upper than the lower end of the curved bead b2, and a position of a radius curvature end line at an upper end of the curved portion 18R of the right wall portion 18 is located at a position substantially matching an upper end of the curved bead b2 or a position lower than the upper end of the curved bead b2.

Further, the curved portion 16R in the left wall portion 16, the curved portion 26R and the curved bead b1 of the bottom wall portion 26t of the depressed wall portion 26 in the left wall portion 16, the curved portion 28R and the curved bead b2 of the bottom wall portion 28t of the depressed wall portion 28 in the right wall portion 18, and the curved portion 18R in the right wall portion 18 are parallel to one another, and a curvature R1 of the curved portion 16R, a curvature R2 of the curved portion 26R, a curvature of the curved bead b1, a curvature of the curved bead b2, a curvature R3 of the curved portion 28R, and a curvature of the curved portion 18R are equal to one another.

When the pedal arm 1 having the above structure is mounted on a vehicle as a pedal arm in a brake system, the pedal arm 1 makes a rotation around the shaft portion 40 in response to a driver's operation of pressing the pedal pad portion 30, thus achieving a desired braking operation.

A method of manufacturing the pedal arm 1 having the above structure with a manufacturing apparatus is explained below in detail with further reference to FIGS. 4 to 11.

Figure 4:
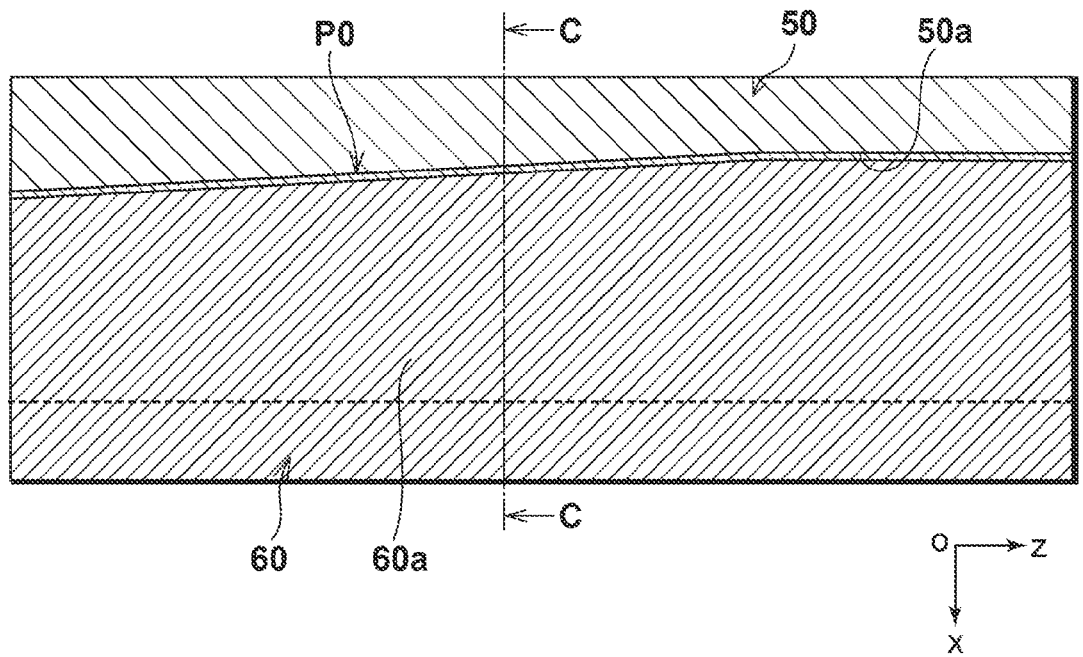
FIG. 4 is a cross-sectional view showing a preliminary process for forming an arm main body of the pedal arm of the present embodiment as a tubular-shaped member, which is a cross-sectional view along a line D-D shown in FIG. 5.
Figure 5:
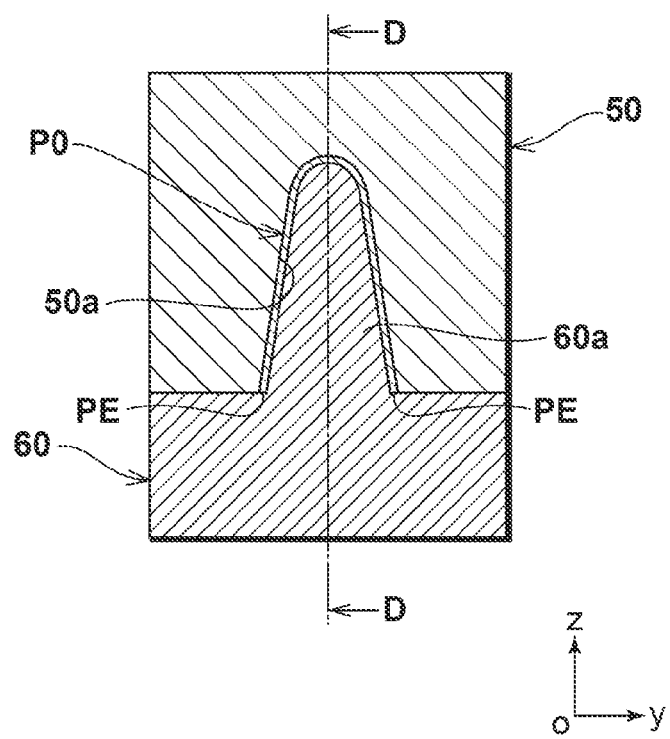
FIG. 5 is a cross-sectional view along a line C-C shown in FIG. 4.
Figure 6:
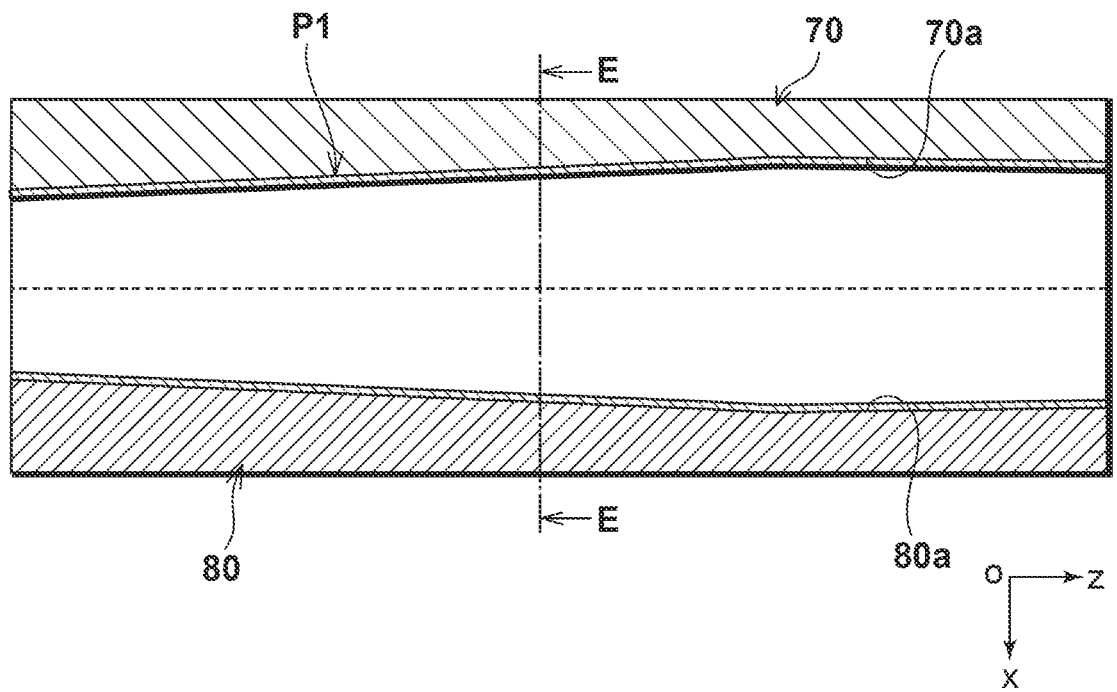
FIG. 6 is a cross-sectional view showing a process for forming the arm main body of the present embodiment as a tubular-shaped member performed after the process shown in FIGS. 4 and 5, which is a cross-sectional view along a line F-F shown in FIG. 7.
Figure 7:
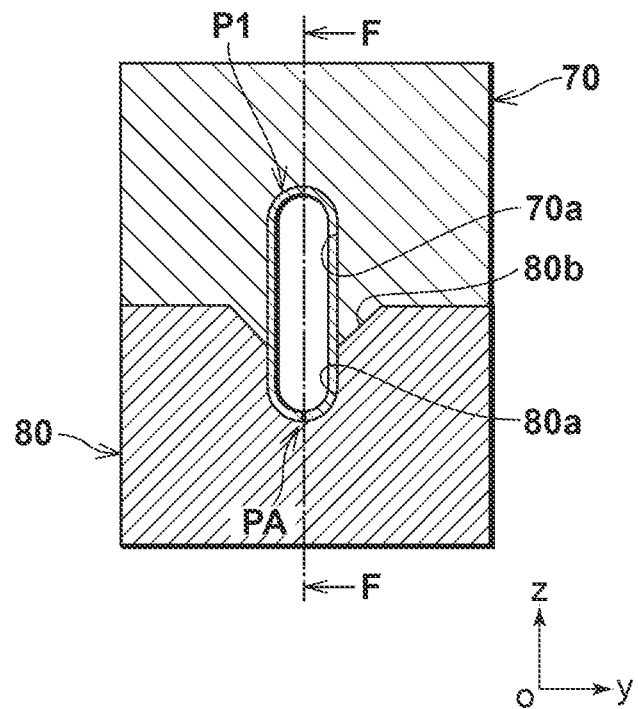
FIG. 7 is a cross-sectional view along a line E-E shown in FIG. 6.
Figure 8:
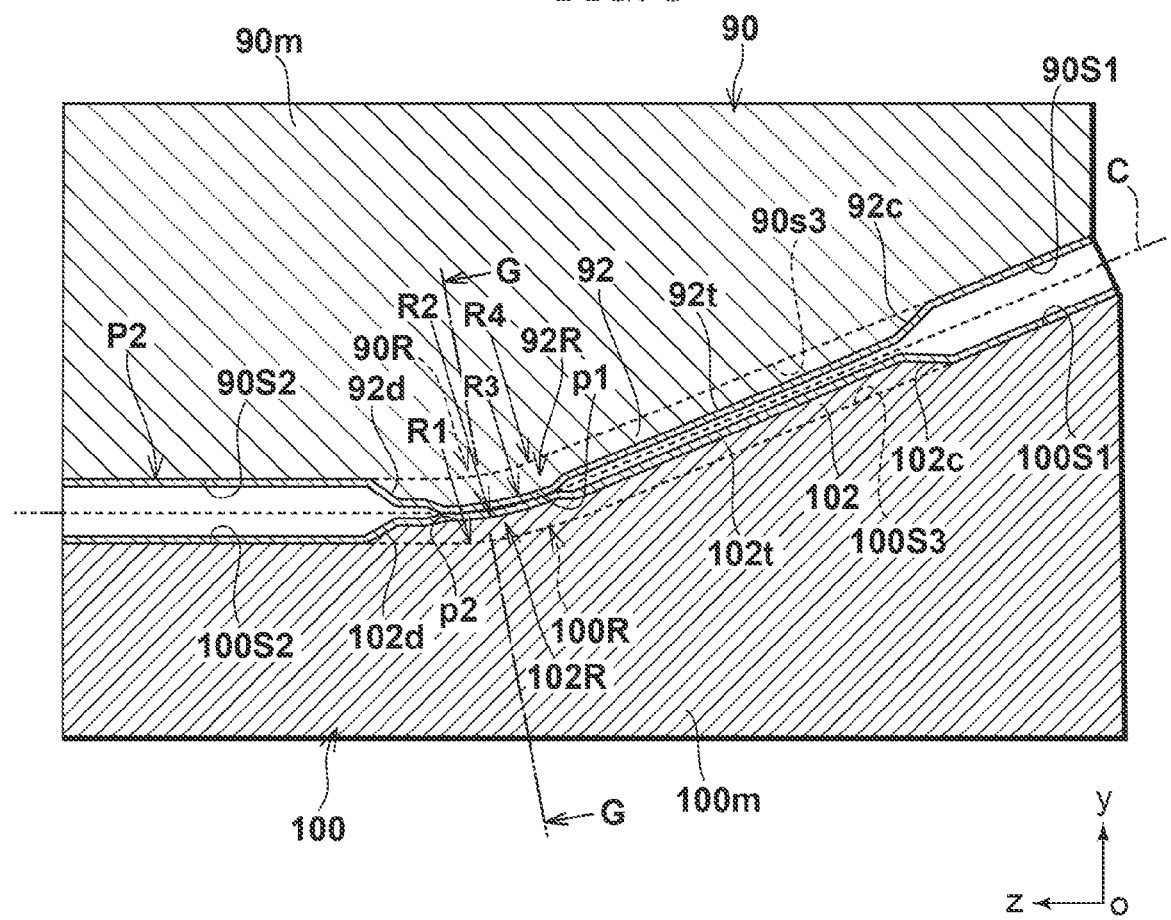
FIG. 8 is a cross-sectional view showing a process for bending a tubular-shaped member obtained by the process shown in FIGS. 6 and 7.
Figure 9:
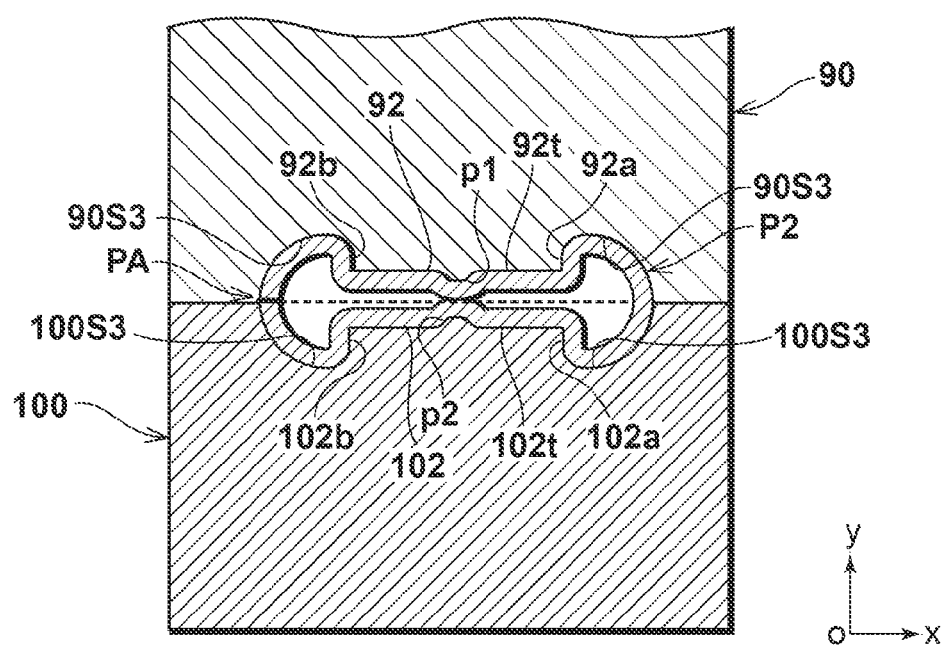
FIG. 9 is an enlarged cross-sectional view along a line G-G shown in FIG. 8.
Figure 10:
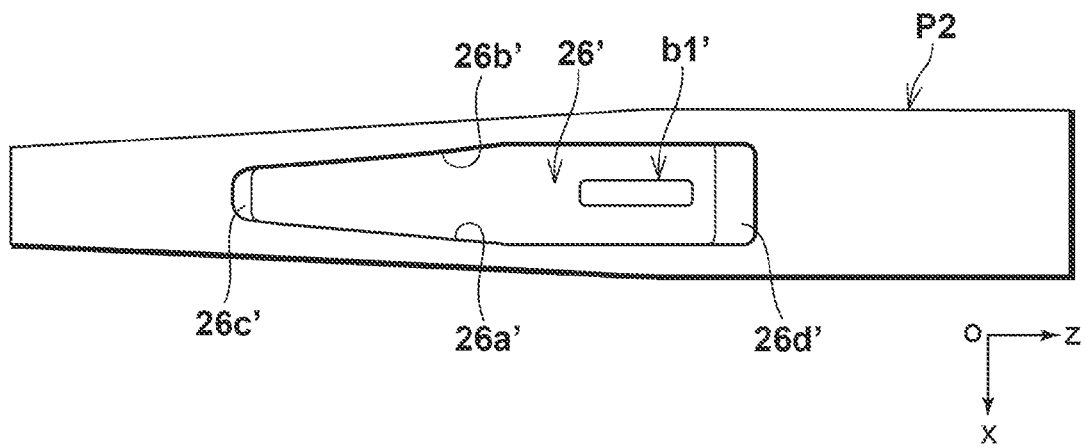
FIG. 10 is a side view of a tubular-shaped member obtained by the process shown in FIGS. 8 and 9.
Figure 11:
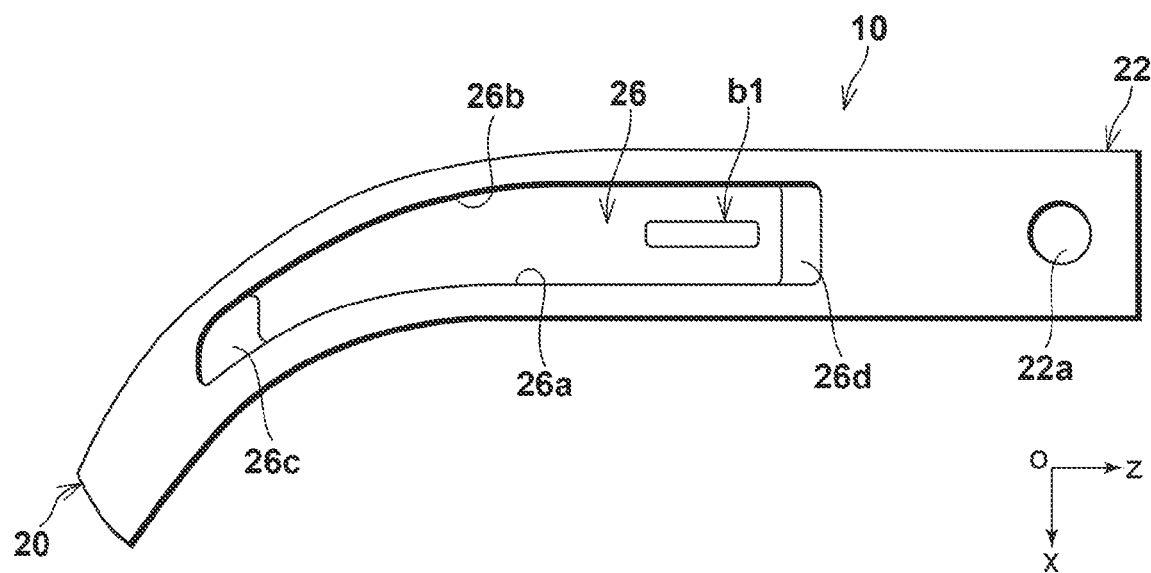
FIG. 11 is a side view of the arm main body of the pedal arm of the present embodiment obtained by performing final machining process on the tubular-shaped member shown in FIG. 10.

FIG. 4 is a cross-sectional view showing a preliminary process for forming the arm main body of the pedal arm of the present embodiment as a tubular-shaped member, which is a cross-sectional view along a line D-D shown in FIG. 5, and FIG. 5 is a cross-sectional view along a line C-C shown in FIG. 4. FIG. 6 is a cross-sectional view showing a process for forming the arm main body as the tubular-shaped member performed after the process shown in FIGS. 4 and 5, which is a cross-sectional view along a line F-F shown in FIG. 7, and FIG. 7 is a cross-sectional view along a line E-E shown in FIG. 6. FIG. 8 is a cross-sectional view showing a process for bending the tubular-shaped member obtained by the process shown in FIGS. 6 and 7, and FIG. 9 is an enlarged cross-sectional view along a line G-G shown in FIG. 8. FIG. 10 is a side view of the tubular-shaped member obtained by the process shown in FIGS. 8 and 9. FIG. 11 is a side view of the arm main body of the pedal arm obtained by performing final machining process on the tubular-shaped member shown in FIG. 10.

First, in order to manufacture the pedal arm 1, as shown in FIGS. 4 and 5, while holding a plate made of metal such as iron or aluminum between a first upper mold 50 having a concave portion 50a and a first lower mold 60 having a convex portion 60a, the first upper mold 50 is pressed against the first lower mold 60 until they are brought into contact with each other, so that the plate is pressed between the concave portion 50a of the first upper mold 50 and the convex portion 60a of the first lower mold 60, thus obtaining a first processed member P0 that is bent to form a convex shape in a positive direction of the z-axis. At this time, both end portions PE and PE of the first processed member P0 are not brought into contact with each other but separated from each other.

Next, as shown in FIGS. 6 and 7, while holding the first processed member P0 between a second upper mold 70 having a concave portion 70a and a second lower mold 80 having a concave portion 80a and a guide portion 80b having an inclined surface that is inclined to expand toward the positive direction of the z-axis, the second upper mold 70 is pressed against the second lower mold 80. The both end portions PE and PE of the first processed member P0 are guided by the guide portion 80b of the second lower mold 80 in a sliding manner, being fitted into the concave portion 80a of the second lower mold 80, and in this state, the first processed member P0 is pressed between the concave portion 70a of the second upper mold 70 and the concave portion 80a of the second lower mold 80, so that the second upper mold 70 and the second lower mold 80 are brought into contact with each other, thus obtaining a second processed member P1 that is tubular shaped. At this time, both end portions PE and PE of the second processed member P1 are brought into contact with each other to constitute the abutting portion PA.

Subsequently, as shown in FIGS. 8 and 9, while holding the second processed member P1 between a third upper mold 90 and a third lower mold 100, the third upper mold 90 is pressed against the third lower mold 100.

Here, the third upper mold 90 includes a concave portion 90S1 and a concave portion 90S2 respectively formed by a mold body unit 90m being depressed and a convex portion 92 that protrudes downward from the concave portion 90S1 and the concave portion 90S2, and the concave portion 90S1 and the concave portion 90S2 are connected to each other across the convex portion 92 while respectively leaving concave portions 90S3 and 90S3 in the positive direction side and the negative direction side of the x-axis. A shape of the deepest portion of each of the concave portions 90S3 has a curved portion 90R.

Similarly, the third lower mold 100 includes a concave portion 100S1 and a concave portion 100S2 respectively formed by a mold body unit 100m being depressed and a convex portion 102 that protrudes upward from the concave portion 100S1 and the concave portion 100S2, and the concave portion 100S1 and the concave portion 100S2 are connected to each other across the convex portion 102 while respectively leaving concave portions 100S3 and 100S3 in the positive direction side and the negative direction side of the x-axis. A shape of the deepest portion of each of the concave portions 100S3 has a curved portion 100R.

Further, depths of the concave portion 90S1, the concave portion 90S2, and the concave portion 90S3 from a matching surface of the third upper mold 90 and the third lower mold 100, that is, depths from the center axis C, are equal to one another, and similarly, depths of the concave portion 100S1, the concave portion 100S2, and the concave portion 100S3 from the matching surface of the third upper mold 90 and the third lower mold 100, that is, depths from the center axis C, are equal to one another.

That is, the concave portion 90S1 of the third upper mold 90 and the concave portion 100S1 of the third lower mold 100 include, in a state where the third upper mold 90 and the third lower mold 100 are brought into contact with each other, a pair of first inner wall portions facing each other in the x-axis direction, which are curved in an arc shape in a cross section perpendicular to the center axis C and a pair of second inner wall portions that are flat portions facing each other, which respectively connects the pair of the first inner wall portions, by which a cavity is formed. Therefore, the concave portion 90S1 of the third upper mold 90 and the concave portion 100S1 of the third lower mold 100 cooperatedly form portions for constituting the lower wall portion 16a of the left wall portion 16, the lower wall portion 18a of the right wall portion 18, and the rear wall portion 12 and the front wall portion 14 at positions respectively corresponding to the lower wall portion 16a and the lower wall portion 18a in the arm main body 10.

Similarly, the concave portion 90S2 of the third upper mold 90 and the concave portion 100S2 of the third lower mold 100 include, in a state where the third upper mold 90 and the third lower mold 100 are brought into contact with each other, a pair of third inner wall portions facing each other in the x-axis direction, which are curved in an arc shape in a cross section perpendicular to the center axis C and a pair of fourth inner wall portions that are flat portions facing each other, which respectively connects the pair of the third inner wall portions, by which a cavity is formed. Therefore, the concave portion 90S1 of the third upper mold 90 and the concave portion 100S1 of the third lower mold 100 cooperatedly form portions for constituting the upper wall portion 16b of the left wall portion 16, the upper wall portion 18b of the right wall portion 18, and the rear wall portion 12 and the front wall portion 14 at positions respectively corresponding to the upper wall portion 16b and the upper wall portion 18b in the arm main body 10.

Also, the convex portion 92 of the third upper mold 90 includes a top wall portion 92t, a wall portion 92a, a wall portion 92b, an inclined wall portion 92c, and an inclined wall portion 92d. The top wall portion 92t includes a flat portion formed with a curved portion 92R in the middle of the flat portion. The wall portion 92a is formed on the positive direction side of the x-axis in the top wall portion 92t in such a manner that it is bent from the top wall portion 92t in the positive direction of the y-axis. The wall portion 92b is formed on the negative direction side of the x-axis in the top wall portion 92t in such a manner that it is bent from the top wall portion 92t in the positive direction of the y-axis. The inclined wall portion 92c is formed on the negative direction side of the z-axis in the top wall portion 92t in such a manner that it is slanted from the top wall portion 92t in a direction perpendicular to the x-y plane. The inclined wall portion 92d is formed on the positive direction side of the z-axis in the top wall portion 92t in such a manner that it is slanted from the top wall portion 92t in a direction perpendicular to the x-y plane.

In addition, in the top wall portion 92t, a portion on the inclined wall portion 92c side and a portion on the inclined wall portion 92d side are connected to the concave portion 90S1 and the concave portion 90S2, respectively, via the inclined wall portion 92c and the inclined wall portion 92d.

Similarly, the convex portion 102 of the third lower mold 100 includes a top wall portion 102t, a wall portion 102a, a wall portion 102b, an inclined wall portion 102c, and an inclined wall portion 102d. The top wall portion 102t includes a flat portion formed with a curved portion 102R in the middle of the flat portion. The wall portion 102a is formed on the positive direction side of the x-axis in the top wall portion 102t in such a manner that it is bent from the top wall portion 102t in the negative direction of the y-axis. The wall portion 102b is formed on the negative direction side of the x-axis in the top wall portion 102t in such a manner that it is bent from the top wall portion 102t in the negative direction of the y-axis. The inclined wall portion 102c is formed on the negative direction side of the z-axis in the top wall portion 102t in such a manner that it is slanted from the top wall portion 102t in a direction perpendicular to the x-y plane. The inclined wall portion 102d is formed on the positive direction side of the z-axis in the top wall portion 102t in such a manner that it is slanted from the top wall portion 102t in a direction perpendicular to the x-y plane. In addition, in the top wall portion 102t, a portion on the inclined wall portion 102c side and a portion on the inclined wall portion 102d side are connected to the concave portion 100S1 and the concave portion 100S2, respectively, via the inclined wall portion 102c and the inclined wall portion 102d.

A curved convex portion p1 that is obtained by further protruding the top wall portion 92t downward is formed on the convex portion 92 of the third upper mold 90, and a curved convex portion p2 that is obtained by further protruding the top wall portion 102t upward is formed on the convex portion 102 of the third lower mold 100.

That is, in a state where the third upper mold 90 and the third lower mold 100 are brought into contact with each other, the convex portion 92 of the third upper mold 90 having the curved convex portion p1 and the convex portion 102 of the third lower mold 100 having the curved convex portion p2 are formed by combining portions for constituting the depressed wall portion 26 of the left wall portion 16 having the curved bead b1 and the depressed wall portion 28 of the right wall portion 18 having the curved bead b2 in the arm main body 10. On the other hand, the concave portions 90S3 and 90S3 across the convex portion 92 and the concave portions 100S3 and 100S3 across the convex portion 102 are formed by combining portions for constituting the left wall portion 16 around the depressed wall portion 26 and the right wall portion 18 around the depressed wall portion 28 and the rear wall portion 12 and the front wall portion 14 at positions respectively corresponding to the depressed wall portion 26 and the depressed wall portion 28.

Therefore, in a state where the third upper mold 90 is pressed against the third lower mold 100 while holding the second processed member P1 between the third upper mold 90 and the third lower mold 100 so that the third upper mold 90 and the third lower mold 100 are brought into contact with each other while pressing the second processed member P1 with a predetermined pressing force, a third processed member P2 of a tubular shape having a curved portion that curves to form a convex shape in the negative direction of the y-axis is obtained. As shown in FIG. 10, portions of the third processed member P2 constituting the depressed wall portion 26 in the arm main body are denoted as a depressed wall portion 26', a rear wall portion 26a', a front wall portion 26b', a lower inclined wall portion 26c', an upper inclined wall portion 26d', a bottom wall portion 26t', and a curved bead b1', for the convenience of explanation.

Here, the curved portion 90R in the concave portion 90S3 of the third upper mold 90, the curved portion 92R and the curved concave portion p1 in the convex portion 92 of the third upper mold 90, the curved portion 102R and the curved convex portion p2 in the convex portion 102 of the third lower mold 100, and the curved portion 100R in the concave portion 100S3 of the third lower mold 100 are parallel to one another, and a curvature R4 of the curved portion 90R, a curvature R3 of the curved portion 92R, a curvature of the curved bead b1, a curvature of the curved bead b2, a curvature R2 of the curved portion 102R, and a curvature R1 of the curved portion 100R are equal to one another. Therefore, by using the third upper mold 90 and the third lower mold 100, the deformation of the member along the center axis C is materially smooth so that the curved portions are formed without causing an unnecessary deformation when obtaining the third processed member P2 of the tubular shape having the curved portions from the second processed member P1 of the tubular shape having the abutting portion PA, and at the same time, the abutting portion PA extends parallel to the curved portions without being separated in a substantial manner.

Furthermore, because the curved bead b1 formed on the convex portion 92 of the third upper mold 90 and the curved bead b2 formed on the convex portion 102 of the third lower mold 100 are brought into contact with each other, it is possible to bend the member while positioning the curved portions, so that the curved portions are formed in a precise manner in a state where the deformation of the member is kept materially smooth. In addition, because surroundings of the curved portions are held by using the top wall portion 92t having the flat portion formed with the curved portion 92R in the convex portion 92 of the third upper mold 90 and the top wall portion 102t having the flat portion formed with the curved portion 102R in the convex portion 102 of the third lower mold 100, the curved portions are formed in a precise manner in a state where the deformation of the member is kept materially smooth without fail.

Next, as shown in FIG. 11, by using a frame or a jig (not shown), the third processed member P2 is bent to form a convex shape in the negative direction of the x-axis, obtaining the arm main body 10, and the pedal pad portion 30 and the shaft portion 40 are fixed with respect to the arm main body 10, thus obtaining the pedal arm 1 shown in FIG. 1.

Because depressed wall portions for forming the depressed wall portion 26 of the left wall portion 16 and the depressed wall portion 28 of the right wall portion 18 in the arm main body 10 are formed on the third processed member P2, when bending the third processed member P2 to form a convex shape in the negative direction of the x-axis, the depressed wall portions serve as room for relieving a deformation of the member, so that there occurs no unnecessary deformation such as a separation of the abutting portion PA of the arm main body 10.

As described above, according to the configuration of the present embodiment, the arm main body includes the first wall portion and the second wall portion facing each other in the first direction, and the third wall portion and the fourth wall portion facing each other in the second direction that is different from the first direction. Here, one of the first wall portion and the second wall portion includes the abutting portion at which the first end portion and the second end portion of the plate member are brought into contact with each other, and the third wall portion and the fourth wall portion correspondingly include the first curved portion and the second curved portion, which are curved in parallel to each other with the same curvature along the extending direction of the arm main body. Also, the first depressed wall portion and the second depressed wall portion are correspondingly formed on the first curved portion and the second curved portion, which are formed in inward convex shapes, respectively, and at least parts of the first depressed wall portion and the second depressed wall portion are brought into contact with each other. Therefore, it is possible to provide the pedal arm with a simplified structure while maintaining high shape accuracy in a stable manner at the time of mass production thereof and while ensuring its strength in a necessary and sufficient manner and enhancing designing flexibility of its shape.

Further, because the first depressed wall portion includes the flat portion that extends to form the first curved portion in the middle thereof, and the second depressed wall portion includes the flat portion that extends to form the second curved portion in the middle thereof, the flat portions adjacent to the curved portions can be held when forming the curved portions. Therefore, it is possible to provide the pedal arm with a simplified structure with which high shape accuracy can be maintained in a stable manner at the time of mass production thereof.

Furthermore, because the first depressed wall portion and the second depressed wall portion include respective bead portions, and the first depressed wall portion and the second depressed wall portion are brought into contact with each other at the respective bead portions, the arm main body can be formed while positioning portions at which the curved portions are formed in a simple and secured manner by bringing the portions into contact with each other when forming the curved portions.

Therefore, it is possible to provide the pedal arm with a simplified structure with which high shape accuracy can be maintained in a stable manner at the time of mass production thereof while enhancing the strength.

Second Embodiment

Next, a pedal arm of a second embodiment according to the present invention is described below in detail with reference mainly to FIGS. 12 to 13B.

Figure 12:
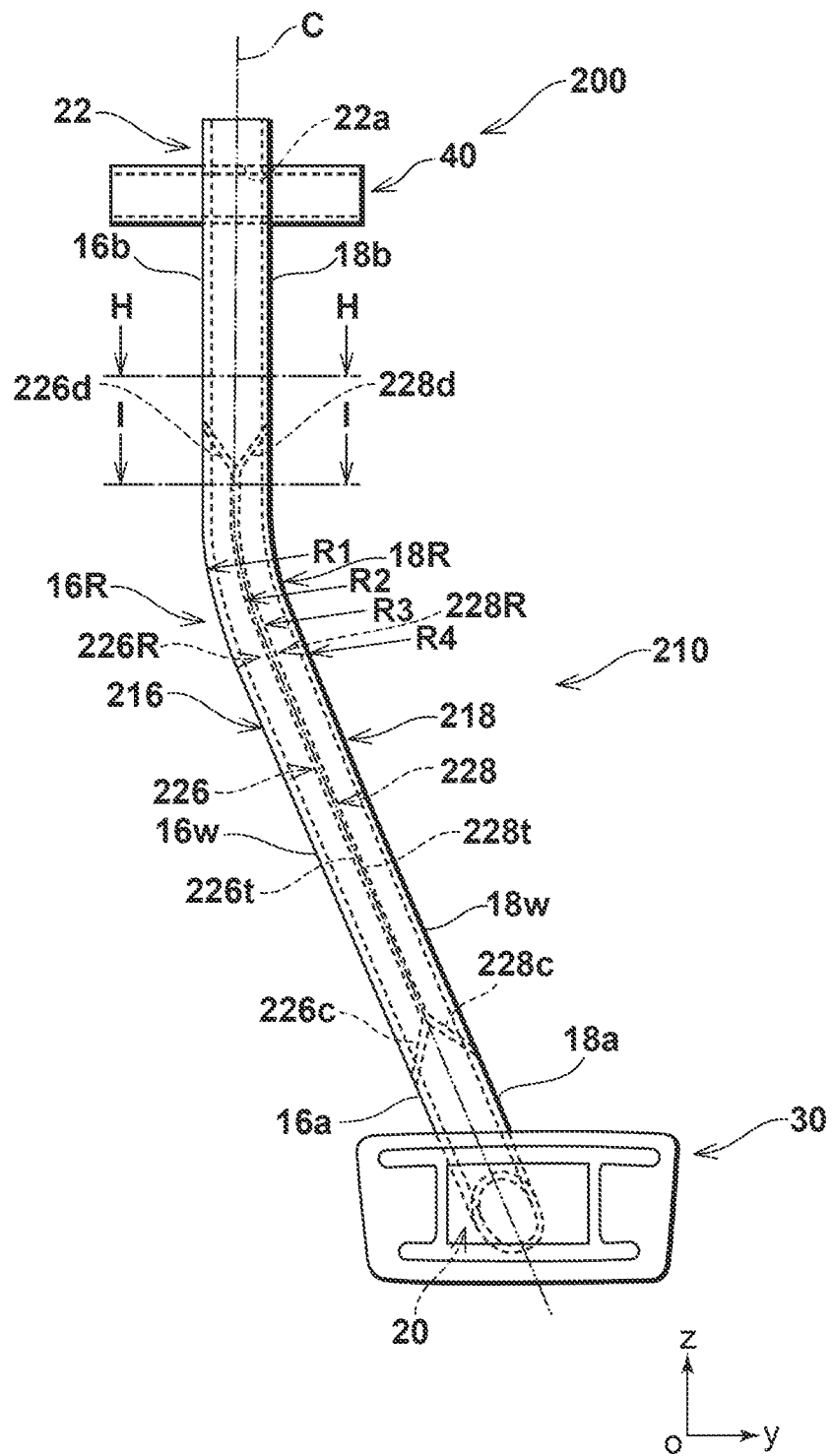
FIG. 12 is a front view of a pedal arm of a second embodiment according to the present invention.
Figure 13A:
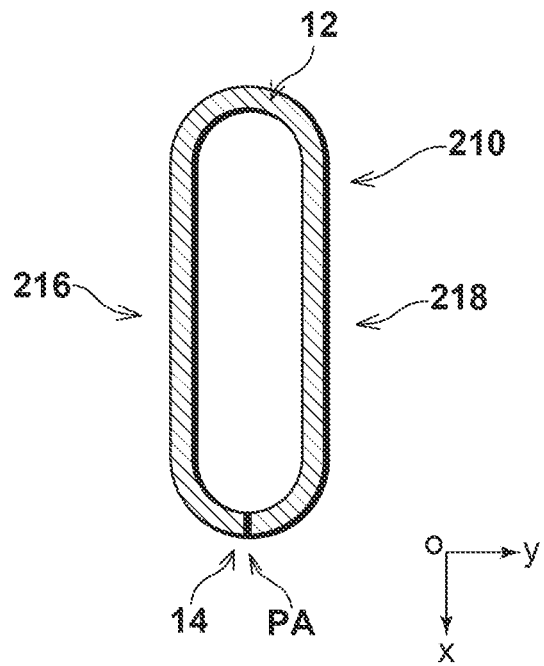
FIG. 13A is an enlarged cross-sectional view of the pedal arm of the present embodiment, which is an enlarged cross-sectional view along a line H-H shown in FIG. 12.

FIG. 12 is a front view of a pedal arm of the present embodiment. FIGS. 13A and 13B are enlarged cross-sectional views of the pedal arm of the present embodiment, where FIG. 13A is an enlarged cross-sectional view along a line H-H shown in FIG. 12, and FIG. 13B is an enlarged cross-sectional view along a line I-I shown in FIG. 12.

A pedal arm 200 of the present embodiment is different from the pedal arm 1 of the first embodiment in that configurations of depressed wall portions 226 and 228 are different, while other configurations of the present embodiment are identical to those of the first embodiment. Therefore, in the present embodiment, descriptions will be given focusing on such differences, and like component parts bears the same reference numerals to suitably simplify or omit descriptions thereof.

Figure 13B:
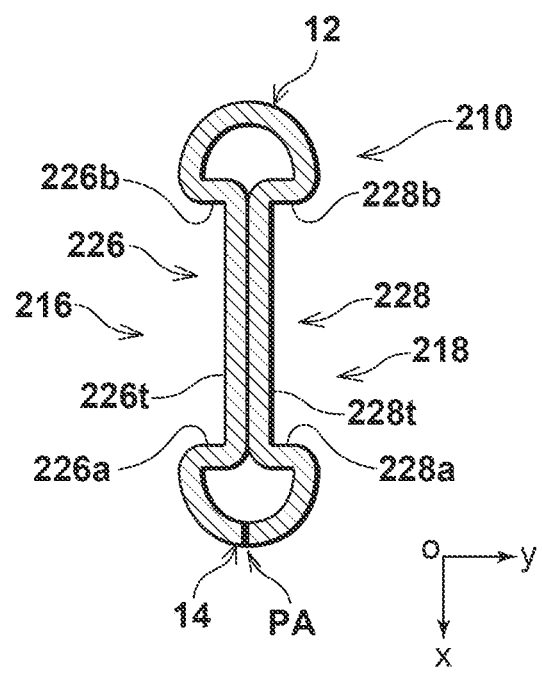
FIG. 13B is an enlarged cross-sectional view of the pedal arm of the present embodiment, which is an enlarged cross-sectional view along a line I-I shown in FIG. 12.

As shown in FIGS. 12 to 13B, in the pedal arm 200 of the present embodiment, an arm main body 210 includes a left wall portion 216 and a right wall portion 218 facing each other in the y-axis direction, the left wall portion 216 includes the depressed wall portion 226 that is formed by depressing a part of the wall surface 16w of the left wall portion 216 in the positive direction of the y-axis, and the right wall portion 218 includes the depressed wall portion 228 that is formed by depressing a part of a wall surface 18w of the right wall portion 218 in the negative direction of the y-axis.

Specifically, the depressed wall portion 226 of the left wall portion 216 includes a bottom wall portion 226t, a rear wall portion 226a, a front wall portion 226b, a lower inclined wall portion 226c, and an upper inclined wall portion 226d. The bottom wall portion 226t includes a flat portion parallel to the wall surface 16w of the left wall portion 216 and formed with a curved portion 226R in the middle of the flat portion. The rear wall portion 226a is formed on the positive direction side of the x-axis in the bottom wall portion 226t in such a manner that it is bent from the bottom wall portion 226t to stand up in the negative direction of the y-axis. The front wall portion 226b is formed on the negative direction side of the x-axis parallel to the rear wall portion 226a in such a manner that it is bent from the bottom wall portion 226t to stand up in the negative direction of the y-axis. The lower inclined wall portion 226c is formed on the negative direction side of the z-axis in such a manner that it is slanted from the bottom wall portion 226t to stand up in a direction crossing the x-y plane. The upper inclined wall portion 226d is formed on the positive direction side of the z-axis in such a manner that it is slanted from the bottom wall portion 226t to stand up in a direction crossing the x-y plane. In addition, the bottom wall portion 226t of the depressed wall portion 226 extends until a position of the lower wall portion 16a that is a flat portion, the rear wall portion 226a and the front wall portion 226b are bent from the lower inclined wall portion 226c to stand up at a position of the lower inclined wall portion 226c, and the lower inclined wall portion 226c connects the bottom wall portion 226t to the lower wall portion 16a therethrough. Incidentally, such a structure of the bottom wall portion 226t is shown in similar concerning the upper wall portion 16b.

Meanwhile, the depressed wall portion 228 of the right wall portion 218 includes a bottom wall portion 228t, a rear wall portion 228a, a front wall portion 228b, a lower inclined wall portion 228c, and an upper inclined wall portion 228d. The bottom wall portion 228t includes a flat portion parallel to the wall surface 18w of the right wall portion 218 and formed with a curved portion 228R in the middle of the flat portion. The rear wall portion 228a is formed on the positive direction side of the x-axis in the bottom wall portion 228t in such a manner that it is bent from the bottom wall portion 228t to stand up in the positive direction of the y-axis. The front wall portion 228b is formed on a negative direction side of the x-axis parallel to the rear wall portion 228a in such a manner that it is bent from the bottom wall portion 228t to stand up in the positive direction of the y-axis. The lower inclined wall portion 228c is formed on the negative direction side of the z-axis from the bottom wall portion 228t in such a manner that it is slanted from the bottom wall portion 228t to stand up in a direction crossing the x-y plane. The upper inclined wall portion 228d is formed on the positive direction side of the z-axis in such a manner that it is slanted from the bottom wall portion 228t to stand up in a direction crossing the x-y plane. In addition, the bottom wall portion 228t of the depressed wall portion 228 extends until a position of a lower wall portion 18a that is a flat portion, the rear wall portion 228a and the front wall portion 228b are bent from the lower inclined wall portion 228c to stand up at a position of the lower inclined wall portion 228c, and the lower inclined wall portion 228c connects the bottom wall portion 228t to the lower wall portion 18a therethrough. Incidentally, such a structure of the bottom wall portion 228t is shown in similar concerning the upper wall portion 18b.

Here, the bottom wall portion 226t in the depressed wall portion 226 of the left wall portion 216 and the bottom wall portion 228t in the depressed wall portion 228 of the right wall portion 218 are entirely brought into contact with each other without being separated from each other in a substantial manner.

The curved portion 16R in the left wall portion 216, the curved portion 226R of the bottom wall portion 226t of the depressed wall portion 226 in the left wall portion 216, the curved portion 228R of the bottom wall portion 228t of the depressed wall portion 228 in the right wall portion 218, and the curved portion 18R in the right wall portion 218 are parallel to one another, and a curvature R1 of the curved portion 16R, a curvature R2 of the curved portion 226R, a curvature R3 of the curved portion 228R, and a curvature R4 or the curved portion 18R are equal to one another.

In order to manufacture the pedal arm 200 having the above structure, as explained in the first embodiment, after obtaining a tubular-shaped processed member, a tubular-shaped processed member having a curved portion that is curved to form a convex in the negative direction of the y-axis is obtained with a mold such as that shown in FIG. 8. However, because the bottom wall portion 226t in the depressed wall portion 226 of the left wall portion 216 and the bottom wall portion 228t in the depressed wall portion 228 of the right wall portion 218 are brought into contact with each other without being separated from each other in a substantial manner, the curved portion can be formed in a more precise manner in a state where the flow of the member is kept smooth by ensuring a holding state of the curved portion and its periphery in a secured manner at the time of processing. In addition, because depths of the depressed wall portion 226 of the left wall portion 216 and the depressed wall portion 228 of the right wall portion 218 can be taken deeper, the strength of the manufactured pedal arm 200 can be also enhanced.

As described above, according to the configuration of the present embodiment, because the bottom wall portion of the first depressed wall portion and the bottom wall portion of the second depressed wall portion are entirely brought into contact with each other, the arm main body can be formed while positioning portions at which the curved portions are formed in a simple and secured manner by bringing the portions into contact with each other when forming the curved portions. Therefore, it is possible to provide the pedal arm with a simplified structure with which high shape accuracy can be maintained in a stable manner at the time of mass production thereof while enhancing the strength.

Third Embodiment

Next, a pedal arm of a third embodiment according to the present invention is described below in detail with reference mainly to FIGS. 14 to 15B.

Figure 14:
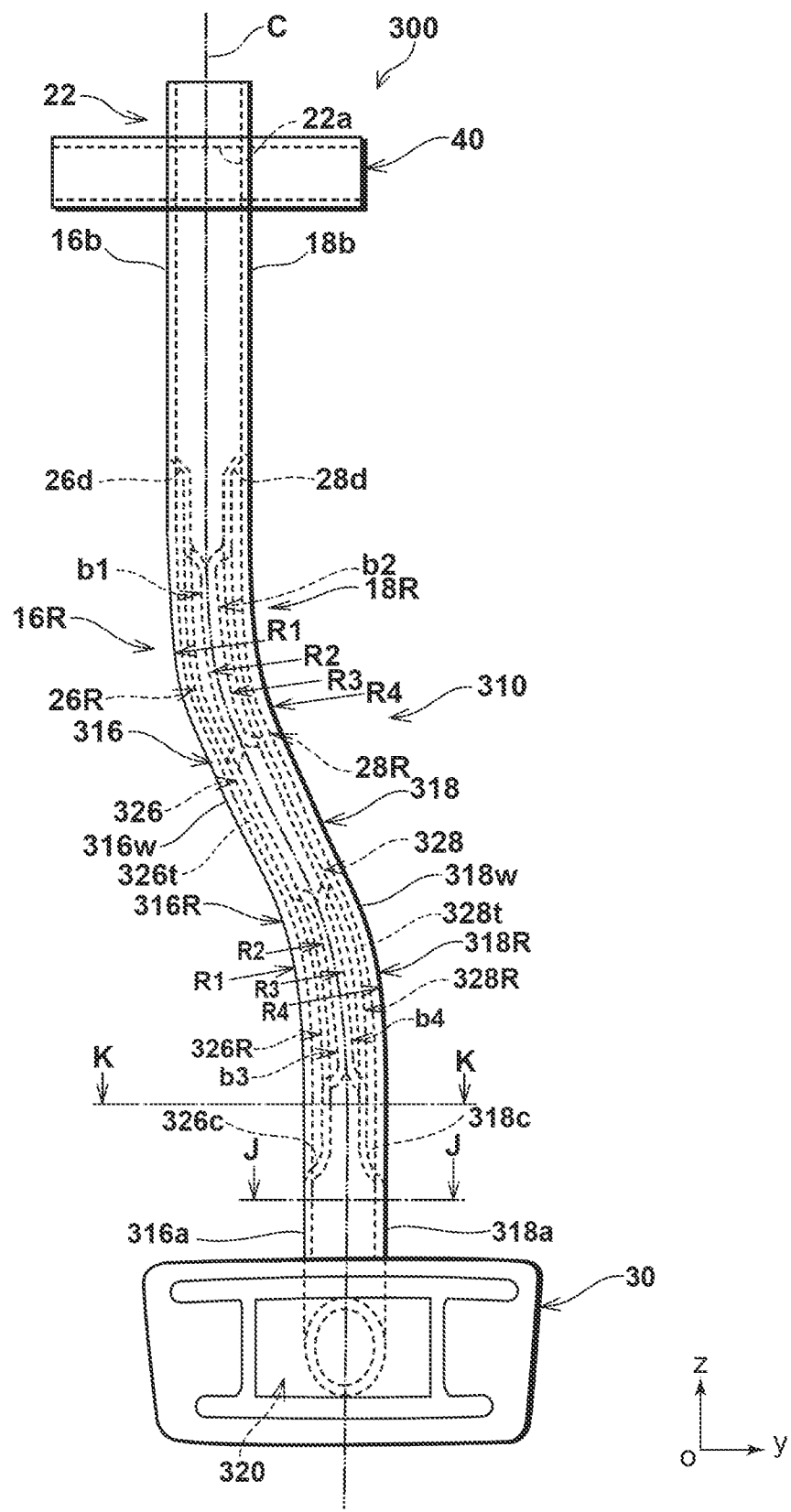
FIG. 14 is a front view of a pedal arm of a third embodiment according to the present invention.
Figure 15A:
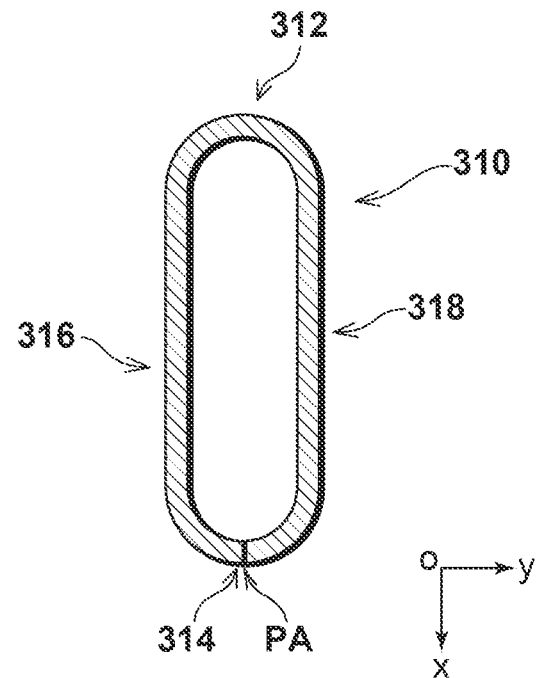
FIG. 15A is an enlarged cross-sectional view of the pedal arm of the present embodiment, which is an enlarged cross-sectional view along a line J-J shown in FIG. 14.

FIG. 14 is a front view of a pedal arm of the present embodiment. FIGS. 15A and 15B are enlarged cross-sectional views of the pedal arm of the present embodiment, where FIG. 15A is an enlarged cross-sectional view along a line J-J shown in FIG. 14, and FIG. 13B is an enlarged cross-sectional view along a line K-K shown in FIG. 14.

A pedal arm 300 of the present embodiment is different from the pedal arm 1 of the first embodiment in that an arm main body 310 further includes a curved portion on a lower side thereof, while other configurations of the present embodiment are identical to those of the first embodiment. Therefore, in the present embodiment, descriptions will be given focusing on such differences, and like component parts bears the same reference numerals to suitably simplify or omit descriptions thereof.

Figure 15B:
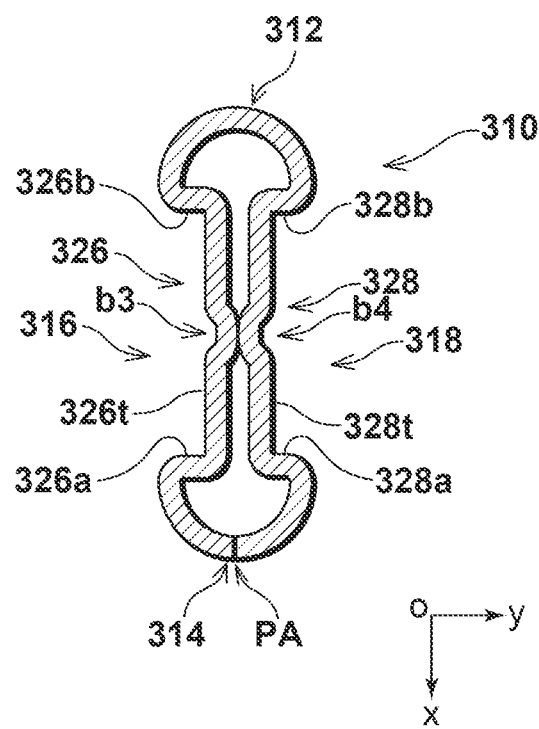
FIG. 15B is an enlarged cross-sectional view of the pedal arm of the present embodiment, which is an enlarged cross-sectional view along a line K-K shown in FIG. 14.

As shown in FIGS. 14 to 15B, in the pedal arm 300, the arm main body 310 includes a left wall portion 316 and a right wall portion 318 facing each other in the y-axis direction.

Specifically, the left wall portion 316 includes a lower wall portion 316a and the upper wall portion 16b, each of which is a flat portion. The lower wall portion 316a and the upper wall portion 16b are connected to each other via, in addition to the curved portion 16R on an upper side of the arm main body 310, a curved portion 316R on the lower side of the arm main body 310, which is curved to form a convex shape to project in the positive direction of the y-axis along the direction of the z-axis along which the arm main body 310 extends. The right wall portion 318 includes a lower wall portion 318a and the upper wall portion 18b, each of which is a flat portion. The lower wall portion 318a and the upper wall portion 18b are connected to each other via, in addition to the curved portion 18R on the upper side of the arm main body 310, a curved portion 318R that is curved to form a convex shape to project in the positive direction of the y-axis along the direction of the z-axis along which the arm main body 310 extends.

The left wall portion 316 further includes a depressed wall portion 326 formed by depressing a part of a wall surface 316w of the left wall portion 316 in the positive direction of the y-axis. The right wall portion 318 further includes a depressed wall portion 328 that is formed by depressing a part of a wall surface 318w of the right wall portion 318 in the negative direction of the y-axis.

More specifically, the depressed wall portion 326 of the left wall portion 316 includes a curved portion 326R on the lower side separately from the curved portion 26R on the upper side. That is, the depressed wall portion 326 includes a bottom wall portion 326t, a rear wall portion 326a, a front wall portion 326b, a lower inclined wall portion 326c, and the upper inclined wall portion 26d. The bottom wall portion 326t includes a flat portion parallel to the wall surface 316w of the left wall portion 316 and formed with, in addition to the curved portion 26R, the curved portion 326R in the middle of the flat portion. The rear wall portion 326a is formed on the positive direction side of the x-axis in the bottom wall portion 326t in such a manner that it is bent from the bottom wall portion 326t to stand up in the negative direction of the y-axis. The front wall portion 326b is formed on the negative direction side of the x-axis parallel to the rear wall portion 26a in such a manner that it is bent from the bottom wall portion 326t in the negative direction of the y-axis. The lower inclined wall portion 326c is formed on the negative direction side of the z-axis in such a manner that it is slanted from the bottom wall portion 326t to stand up in a direction crossing the x-y plane. The upper inclined wall portion 26d is formed on the positive direction side of the z-axis in such a manner that it is slanted from the bottom wall portion 326t to stand up in a direction crossing the x-y plane. In addition, the bottom wall portion 326t of the depressed wall portion 326 extends until a position of the upper wall portion 16b that is a flat portion and, also, the lower wall portion 316a that is a flat portion, the rear wall portion 326a and the front wall portion 326b are bent from the lower inclined wall portion 326c to stand up at a position of the lower inclined wall portion 326c, and the lower inclined wall portion 326c connects the bottom wall portion 326t to the lower wall portion 316a therethrough.

Meanwhile, the depressed wall portion 328 of the right wall portion 318 includes a curved portion 328R on the lower side separately from the curved portion 28R on the upper side. That is, the depressed wall portion 328 includes a bottom wall portion 328t, a rear wall portion 328a, a front wall portion 328b, a lower inclined wall portion 328c, and the upper inclined wall portion 28d. The bottom wall portion 328t includes a flat portion parallel to the wall surface 318w of the right wall portion 318 and formed with, in addition to the curved portion 28R, the curved portion 328R in the middle of the flat portion. The rear wall portion 328a is formed on the positive direction side of the x-axis in the bottom wall portion 328t in such a manner that it is bent from the bottom wall portion 328t to stand up in the positive direction of the y-axis. The front wall portion 328b is formed on the negative direction side of the x-axis parallel to the rear wall portion 328a in such a manner that it is bent from the bottom wall portion 328t in the positive direction of the y-axis. The lower inclined wall portion 328c is formed on the negative direction side of the z-axis in such a manner that it is slanted from the bottom wall portion 328t to stand up in a direction crossing the x-y plane. The upper inclined wall portion 28d is formed on the positive direction side of the z-axis in such a manner that it is slanted from the bottom wall portion 328t to stand up in a direction crossing the x-y plane. In addition, the bottom wall portion 328t of the depressed wall portion 328 extends until a position of the upper wall portion 18b that is a flat portion and, also, the lower wall portion 318a that is a flat portion, the rear wall portion 328a and the front wall portion 328b are bent from the lower inclined wall portion 328c to stand up at a position of the lower inclined wall portion 328c, and the lower inclined wall portion 328c connects the bottom wall portion 328t to the lower wall portion 318a therethrough.

Here, a curved bead b3 is formed on the bottom wall portion 326t in the depressed wall portion 326 of the left wall portion 316 by further depressing a part of the bottom wall portion 326t in the positive direction of the y-axis, and a curved bead b4 is formed on the bottom wall portion 328t in the depressed wall portion 328 of the right wall portion 318 by further depressing a part of the bottom wall portion 328t in the negative direction of the y-axis. Specifically, the bottom wall portion 326t in the depressed wall portion 326 of the left wall portion 316 and the bottom wall portion 328t in the depressed wall portion 328 of the right wall portion 318 are brought into contact with each other at the curved bead b3 and the curved bead b4, while the rest portions of the bottom wall portion 326t and the bottom wall portion 328t other than the curved bead b3 and the curved bead b4 are not brought into contact with each other but substantially separated from each other by a predetermined distance. Furthermore, a position of a radius curvature end line at a lower end of the curved portion 316R of the left wall portion 316 is located at a position substantially matching a lower end of the curved bead b3, or a position upper than the lower end of the curved bead b3, and a position of a radius curvature end line at an upper end of the curved portion 316R of the left wall portion 316 is located at a position substantially matching an upper end of the curved bead b3, or a position lower than the upper end of the curved bead b3. Similarly, a position of a radius curvature end line at a lower end of the curved portion 318R of the right wall portion 318 is located at a position substantially matching a lower end of the curved bead b4, or a position upper than the lower end of the curved bead b4, and a position of a radius curvature end line at an upper end of the curved portion 318R of the right wall portion 316 is located at a position substantially matching an upper end of the curved bead b4, or a position lower than the upper end of the curved bead b4.

Furthermore, although curved in an opposite direction to the curved portion 16R on the upper side in the left wall portion 316, the curved portion 26R and the curved bead b1 on the upper side in the bottom wall portion 326t of the depressed wall portion 326 of the left wall portion 316, the curved portion 28R and the curved bead b2 on the upper side in the bottom wall portion 328t or the depressed wall portion 328 of the right wall portion 318, and the curved portion 18R on the upper side in the right wall portion 318, the curved portion 316R on the lower side in the left wall portion 316, the curved portion 326R and the curved bead b3 in the bottom wall portion 326t of the depressed wall portion 326 of the left wall portion 316, the curved portion 328R and the curved bead b4 on the lower side in the bottom wall portion 328t of the depressed wall portion 328 of the right wall portion 318, and the curved portion 318R on the lower side in the right wall portion 318 are parallel to one another, and a curvature R1 of the curved portion 316R, a curvature R2 of the curved portion 326R, a curvature of the curved bead b3, a curvature of the curved bead b4, a curvature R3 of the curved portion 328R, and a curvature of the curved portion 318R are equal to one another. Although magnitudes of the curvatures are set to all equal in this case, the magnitudes of the curvatures of the upper parts and the magnitudes of the curvatures of the lower parts may differ from one another as necessary.

In order to manufacture the pedal arm 300 having the above structure, as explained in the first embodiment, after obtaining a tubular-shaped processed member, a tubular-shaped processed member having a curved portion on the upper side, which is curved to form a convex in the negative direction of the y-axis, and a curved portion on the lower side, which is curved to form a convex in the positive direction of the y-axis, is obtained with a mold such as that shown in FIG. 8. However, because both the curved portion on the upper side, which is curved to form a convex in the negative direction of the y-axis, and the curved portion on the lower side, which is curved to form a convex in the positive direction of the y-axis, are formed, the flow of the member becomes smooth along the center axis C, so that the curved portions can be formed without causing an unnecessary deformation, and at the same time, the abutting portion PA is substantially never separated from each other. In addition, because a plurality of curved portions is formed in the arm main body 310, the pedal arm 300 with high flexibility in its shape can be obtained with high shape accuracy.

Also in the pedal arm 300 according to the third embodiment, the depressed wall portion 326 of the left wall portion 316 and the depressed wall portion 328 of the right wall portion 318 can be brought into contact with each other without being separated from each other in a substantial manner as the depressed wall portions in the second embodiment.

As described above, according to the configuration of the present embodiment, because the third wall portion and the fourth wall portion further correspondingly includes a third curved portion and a fourth curved portion that curve in parallel to each other with a same curvature in a direction opposite to a direction in which the first curved portion and the second curved portion curve along the extending direction of the arm main body, and, also, a third depressed wall portion and a fourth depressed wall portion are formed on the third curved portion and the fourth curved portion, which are formed in inward convex shapes, respectively, and at least parts of the third depressed wall portion and the fourth depressed wall portion are brought into contact with each other, it is possible to provide the pedal arm having a plurality of curved portions with a simplified structure with which it is possible to maintain high shape accuracy at the time of mass production thereof.

Fourth Embodiment

Next, a pedal arm of a fourth embodiment according to the present invention will be described below in detail with reference mainly to FIGS. 16 to 17B.

Figure 16:
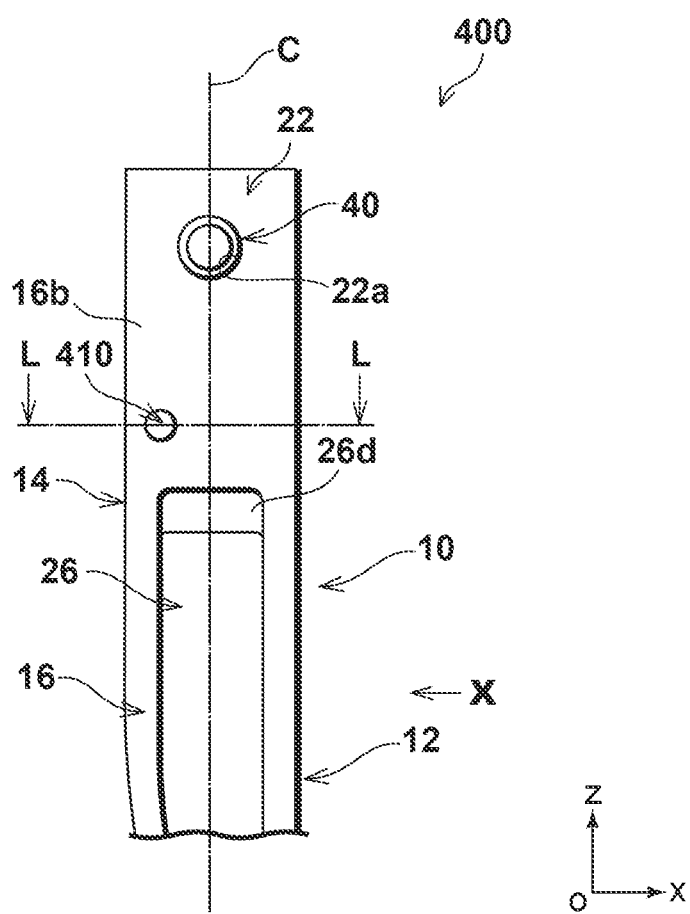
FIG. 16 is a partial side view of a pedal arm of a fourth embodiment according to the present invention.
Figure 17A:
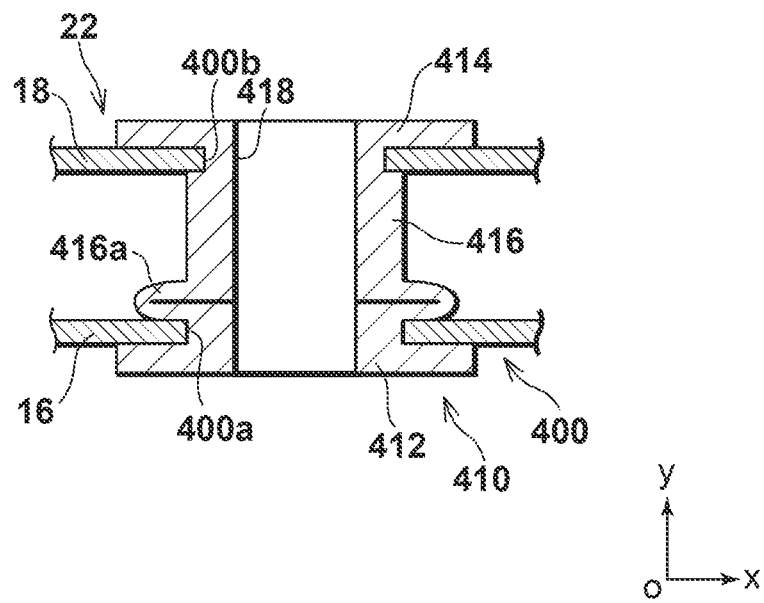
FIG. 17A is an enlarged cross-sectional view of the pedal arm of the present embodiment, which is an enlarged cross-sectional view along a line L-L shown in FIG. 16.

FIG. 16 is a partial side view of a pedal arm of the present embodiment. FIGS. 17A and 17B are enlarged cross-sectional views of the pedal arm of the present embodiment, where FIG. 17A is an enlarged cross-sectional view along a line L-L shown in FIG. 16, and FIG. 17B is an enlarged cross-sectional view showing a process of forming a collar shown in FIG. 17A.

A pedal arm 400 of the present embodiment is different from the pedal arm 1 according to the first embodiment in that a collar 410 to which a pushrod for operating a hydraulic system of a brake is coupled is included, while other configurations of the fourth embodiment are identical to those of the first embodiment. Therefore, in the present embodiment, descriptions will be given focusing on such differences, and like component parts bears the same reference numerals to suitably simplify or omit descriptions thereof.

As shown in FIGS. 16 and 17A, the collar 410 in the pedal arm 400 is fixed to an upper end portion 22 of the pedal arm 400 through a hole 400a of a left wall portion 16 and a hole 400b of a right wall portion 18. The collar 410 includes a flange 412 that makes contact with an outer wall surface of a left wall portion 16, a flange 414 that makes contact with an outer wall surface of a right wall portion 18, and a tubular-shaped main body 416 with the flange 412 and the flange 414 formed on both edges thereof in the y-axis direction. The main body 416 includes a through hole 418 formed therethrough in the y-axis direction and a convex portion 416a that protrudes in a radial direction perpendicular to the y-axis.

Here, in principle, because the collar 410 includes the convex portion 416a that protrudes in the radial direction, when a distance between the left wall portion 16 and the right wall portion 18 is relatively narrow, the collar 410 can be fixed to the pedal arm 400 only by bringing the convex portion 416a into contact with the inner wall surface of the left wall portion 16 and the inner wall surface of the right wall portion 18 without providing the flange 412 and the flange 414 so that the collar 410 does not drop out of the hole 400a of the left wall portion 16 and the hole 400b of the right wall portion 18 in the y-axis direction. On the other hand, when the distance between the left wall portion 16 and the right wall portion 18 is relatively wide, the collar 410 can be fixed to the pedal arm 400 by additionally providing the flange 412 and the flange 414 so that the collar 410 does not drop out of the hole 400a of the left wall portion 16 and the hole 400b of the right wall portion 18 in the y-axis direction by a cooperating action of the convex portion 416a, the flange 412, and the flange 414.

Figure 17B:
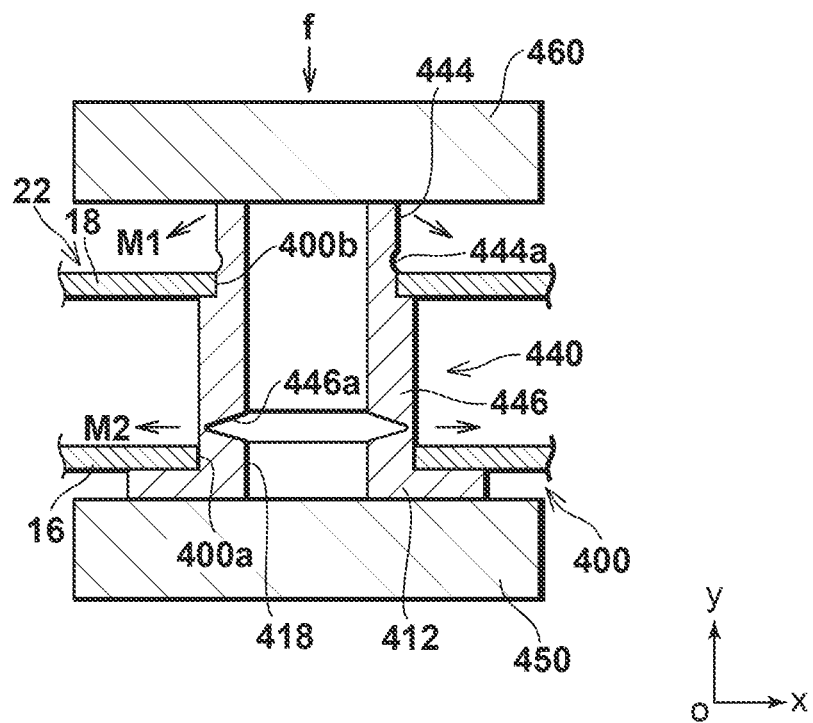
FIG. 17B is an enlarged cross-sectional view of the pedal arm of the present embodiment, which is an enlarged cross-sectional view showing a process of forming a collar shown in FIG. 17A.

As shown in FIG. 17B, in order to fix the collar 410 having the above structure to the pedal arm 400, in addition to providing the flange 412 at the edge on the negative direction side of the y-axis, a tubular-shaped preliminary molded member 440 including a concave portion 444a that is depressed in the radial direction from the outer surface across the whole circumference of the outer surface of an end portion 444 on the positive side of the y-axis and a concave portion 446a that is depressed in the radial direction from the inner surface across the whole circumference of the inner surface of the through hole 418 formed inside a main body 446 is accommodated and held between a lower mold 450 and an upper mold 460 in a state where the flange 412 is brought into contact with the lower mold 450 and the end portion 444 is brought into contact with the upper mold 460.

Thereafter, as shown in FIG. 17B, by pressing the upper mold 460 against the lower mold 450 with a load f, the end portion 444 of the preliminary molded member 570 is turned over as indicated by an arrow M1 from the concave portion 444a that is depressed in the radial direction from the outer surface across the whole circumference of the outer surface as the starting point, so that the flange 414 is formed and brought into contact with the outer wall surface of the right wall portion 18, and at the same time, the main body 446 is expanded as indicated by an arrow M2 from the concave portion 446a that is depressed in the radial direction from the inner surface across the whole circumference of the inner surface of the through hole 418 as the starting point, so that the convex portion 416a is formed. Furthermore, at this time, the flange 412 at the edge on the negative direction side of the y-axis keeps on having contact with the outer wall surface of the left wall portion 16.

After maintaining the pressing state for a predetermined time, by releasing the pressing state so that the upper mold 460 is raised from the lower mold 450, the collar 410 is formed, and at the same time, the collar 410 is fixed to the pedal arm 400 by a cooperating action of the convex portion 416a, the flange 412, and the flange 414.

In order to fix the collar 410 to the pedal arm 400 without providing the flange 412 and the flange 414, after accommodating and holding the preliminary molded member only having the concave portion 446a that is depressed in the radial direction from the inner surface across the whole circumference of the inner surface of the through hole 418 formed inside the main body 446 between the lower mold 450 and the upper mold 460 in the same manner, the upper mold 460 is pressed against the lower mold 450 with a predetermined load.

That is, the collar 410 of the pedal arm 400 according to the fourth embodiment can be applied not only to the tubular-shaped pedal arm 400 but also to other types of objects with high expandability in application, because it can be fixed while extending to couple a pair of plate members facing each other as long as each of the plate members has a hole.

As described above, according to the configuration of the present embodiment, because the collar includes the first convex portion having the diameter expanded in the radial direction thereof by the deformation of the collar, and the collar is prevented from dropping out and fixed to the arm main body with the first convex portion, it is possible to provide the pedal arm with a simplified structure in which the collar is fixed to the pedal arm without using welding.

Particularly, because the collar further includes the pair of flange portions, and the collar is fixed to the third wall portion and the fourth wall portion with the first convex portion and the pair of flange portions, even when a distance between the third wall portion and the fourth wall portion is wide, it is possible to provide the pedal arm with a simplified structure in which the collar is fixed to the pedal arm in a secured manner without using welding.

Fifth Embodiment

Next, a pedal arm of a fifth embodiment according to the present invention is described below in detail with reference mainly to FIGS. 18 to 22.

Figure 18:
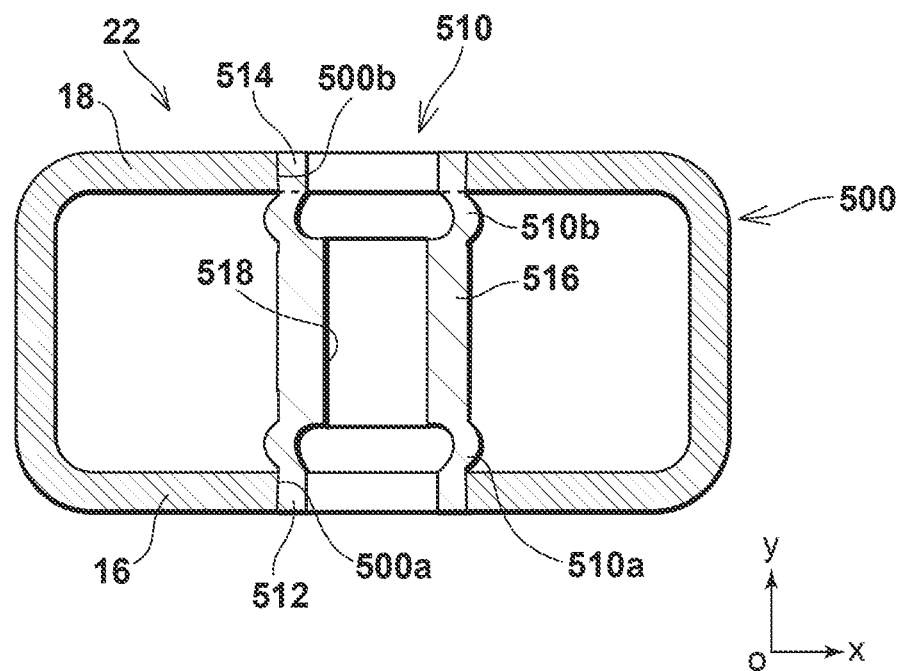
FIG. 18 is an enlarged cross-sectional view of a pedal arm of a fifth embodiment according to the present invention, which positionally corresponds to FIG. 17A.
Figure 19A:
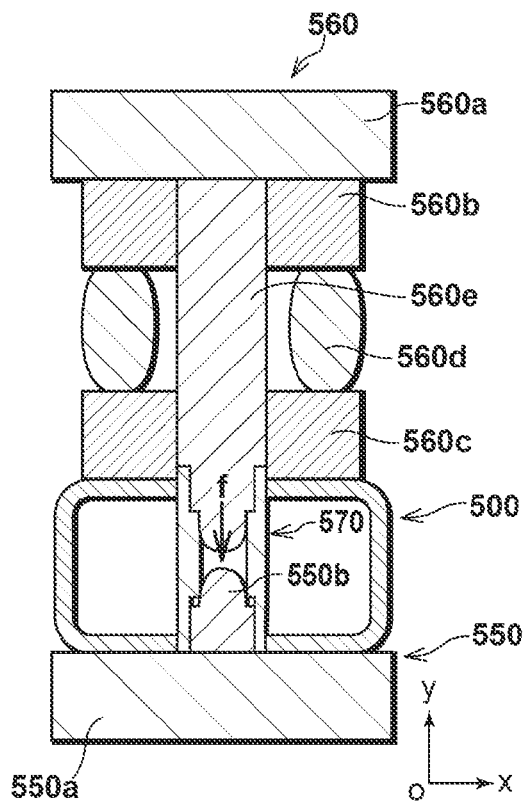
FIGS. 19A to 19D are enlarged cross-sectional views showing processes of forming a collar of the pedal arm of the present embodiment, showing each process sequentially from FIG. 19A to FIG. 19D.
Figure 19B:
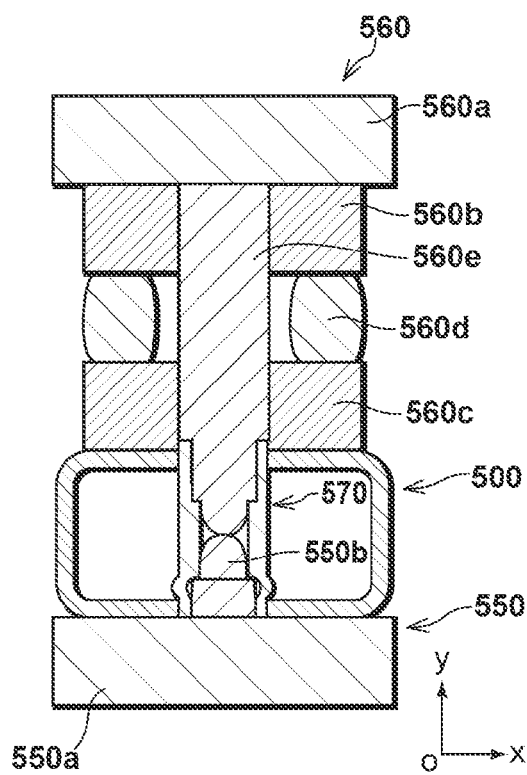
Figure 20:
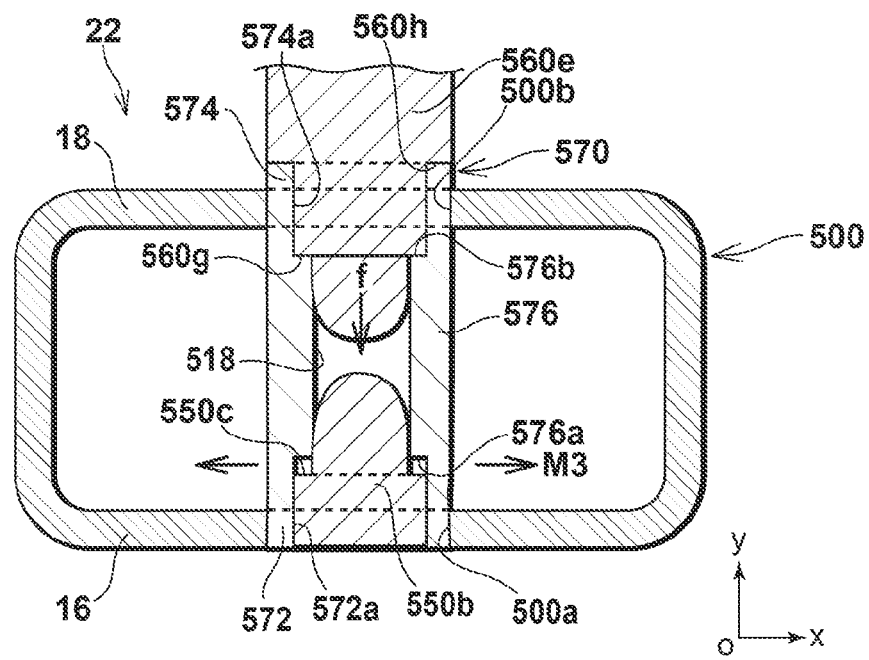
FIG. 20 is a partial enlarged view of FIG. 19A.
Figure 21:
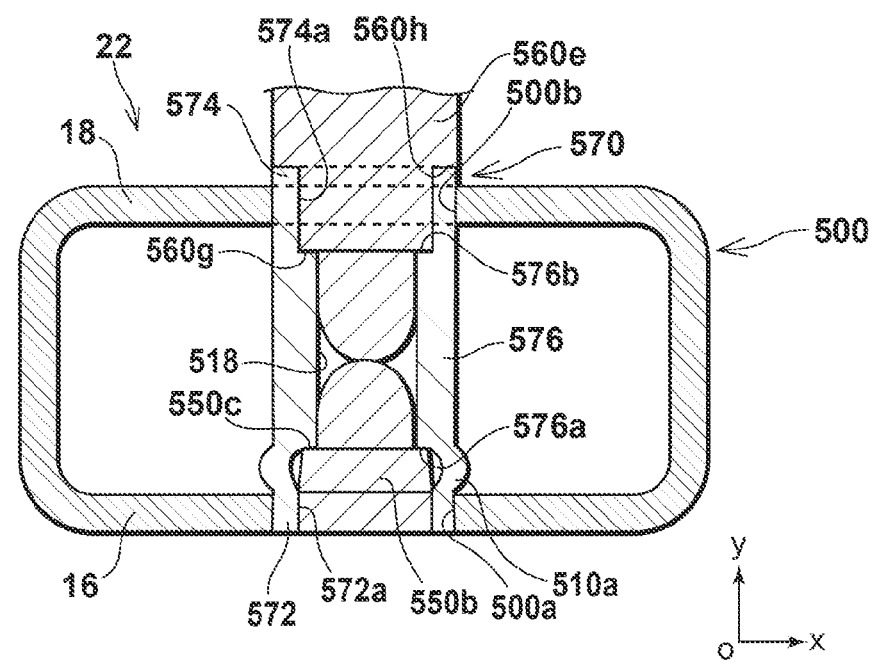
FIG. 21 is a partial enlarged view of FIG. 19B.
Figure 22:
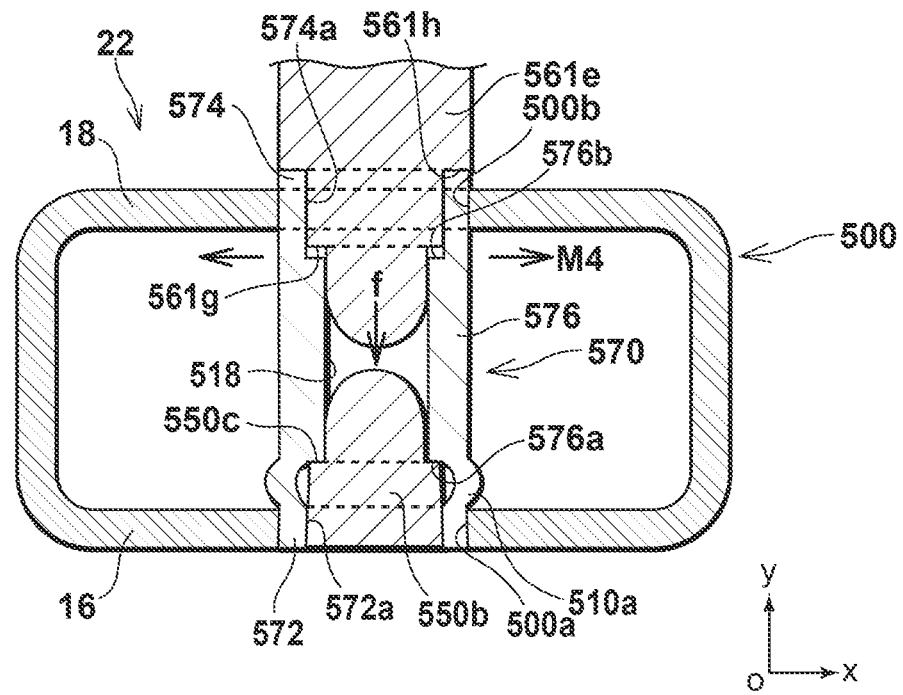
FIG. 22 is a partial enlarged view of FIG. 19C.

FIG. 18 is an enlarged cross-sectional view of a pedal arm of the present embodiment, which positionally corresponds to FIG. 17A. FIGS. 19A to 19D are cross-sectional views showing processes of forming a collar of the pedal arm of the present embodiment, showing each process sequentially from FIG. 19A to FIG. 19D. FIG. 20 is a partial enlarged view of FIG. 19A, FIG. 21 is a partial enlarged view of FIG. 19B, and FIG. 22 is a partial enlarged view of FIG. 19C.

A pedal arm 500 of the present embodiment is different from the pedal arm 400 according to the fourth embodiment in that a configuration of a collar 510 is different, while other configurations of the fifth embodiment are identical to those of the fourth embodiment. Therefore, in the present embodiment, descriptions will be given focusing on such differences, and like component parts bears the same reference numerals to suitably simplify or omit descriptions thereof.

As shown in FIG. 18, the collar 510 of the pedal arm 500 includes a tubular-shaped main body 516 having an end portion 512 on the negative direction side of the y-axis and an end portion 514 on the positive direction side of the y-axis at an upper end portion 22 of the pedal arm 500. The main body 516 includes a through hole 518 that passes through the inside thereof in the y-axis direction and a pair of a convex portion 510a and a convex portion 510b each protruding in a radial direction perpendicular to the y-axis.

Here, because the collar 510 includes a pair the convex portion 510a and the convex portion 510b that protrude in the radial direction on the negative direction side and the positive direction side, respectively, of the main body 516, by bringing the convex portion 510a and the convex portion 510b into contact with an inner wall surface of a left wall portion 16 and an inner wall surface of a right wall portion 18, respectively, the collar 510 can be prevented from dropping out of a hole 500a of the left wall portion 16 and a hole 500b of the right wall portion 18 and fixed to the pedal arm 500. This structure can be applied regardless of a distance between the left wall portion 16 and the right wall portion 18 by appropriately setting a distance between the convex portion 510a and the convex portion 510b.

In order to fix the collar 510 having the above structure to the pedal arm 500, as shown in FIGS. 19A and 20, a tubular-shaped preliminary molded member 570 is accommodate and held between a lower mold 550 and an upper mold 560, and the upper mold 560 is pressed against the lower mold 550 with a load f.

The lower mold 550 includes a punch 550b that protrudes in the positive direction of the y-axis from a supporting unit 550a, and the upper mold 560 includes a punch 560e that protrudes in the negative direction of the y-axis from a supporting unit 560a through a pedestal unit 560b that is fixed to the supporting unit 560a, an elastic member 560d, and a pedestal unit 560c arranged opposite to the pedestal unit 560b in a state where the elastic member 560d is interposed between the pedestal unit 560b and the pedestal unit 560c.

The preliminary molded member 570 includes an end portion 572 having a large-diameter hole portion 572a on the negative direction side of the y-axis, an end portion 574 having a large-diameter hole portion 574a on the positive direction side of the y-axis, and a main body 576 having a through hole 518 therein. In a state where the preliminary molded member 570 is accommodated and held between the lower mold 550 and the upper mold 560, a large-diameter portion of the punch 550b of the lower mold 550 is inserted into the large-diameter hole portion 572a of the preliminary molded member 570, and at the same time, an end portion 550c of the large-diameter portion and an inner end portion 576a of the large-diameter hole portion 572a of the preliminary molded member 570 are put in a state where they are separated from each other while inserting a small-diameter portion at the tip of the punch 550b into through hole 518 of the preliminary molded member 570, and a large-diameter portion of the punch 560e of the upper mold 560 is inserted into the large-diameter hole portion 574a of the preliminary molded member 570, and at the same time, an end portion 560g of the large-diameter portion and an inner end portion 576b of the large-diameter hole portion 574a of the preliminary molded member 570 are put in a state where they are brought into contact with each other while inserting a small-diameter portion at the tip of the punch 560e into through hole 518 of the preliminary molded member 570.

Furthermore, in the above state, by pressing the upper mold 560 against the lower mold 550 with a load f, the upper mold 560 presses the inner end portion 576b of the large-diameter hole portion 574a of the preliminary molded member 570 at the end portion 560g of the punch 560e while compressing the elastic member 560d, and at the same time, presses the end portion 574 on the positive direction side of the y-axis of the preliminary molded member 570 at an upper end portion 560h of the punch 560e. This causes a stress of a wall portion of the preliminary molded member 570 to be increased in surroundings of a portion at which the end portion 550c of the larger-diameter portion of the punch 550b of the lower mold 550 and the inner end portion 576a of the large-diameter hole portion 572a of the preliminary molded member 570 are separated from each other. As a result, as indicated by an arrow M3 shown in FIG. 20, the wall portion of the preliminary molded member 570 is expanded, and as shown in FIGS. 19B and 21, the end portion 550c of the larger-diameter portion of the punch 550b of the lower mold 550 and the inner end portion 576a of the large-diameter hole portion 572a of the preliminary molded member 570 are put in a state where they are brought into contact with each other, and the convex portion 510a on the negative direction side of the y-axis is formed on the preliminary molded member 570.

Figure 19C:
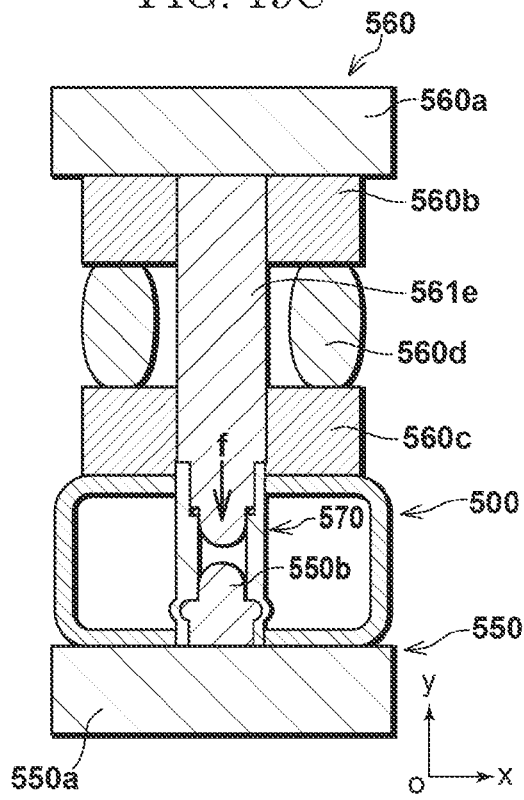

Next, after maintaining the pressing state for a predetermined time, the pressing state is released and the upper mold 560 is raised from the lower mold 550 to replace the punch 560e of the upper mold 560 with another punch 561e, and as shown in FIGS. 19C and 22, the upper mold 560 is pressed against the lower mold 550 again with a load f while accommodating and holding the preliminary molded member 570 on which the convex portion 510a is formed between the lower mold 550 and the upper mold 560.

While maintaining the end portion 550c of the larger-diameter portion of the punch 550b of the lower mold 550 and the inner end portion 576a of the large-diameter hole portion 572a of the preliminary molded member 570 in the state where they are brought into contact with each other, a large-diameter portion of the punch 561e of the upper mold 560 is inserted into the large-diameter hole portion 574a of the preliminary molded member 570, and at the same time, an end portion 561g of the large-diameter portion and the inner end portion 576b of the large-diameter hole portion 574a of the preliminary molded member 570 are put in a state where they are separated from each other while inserting a small-diameter portion at the tip of the punch 561e into the through hole 518 of the preliminary molded member 570.

Figure 19D:
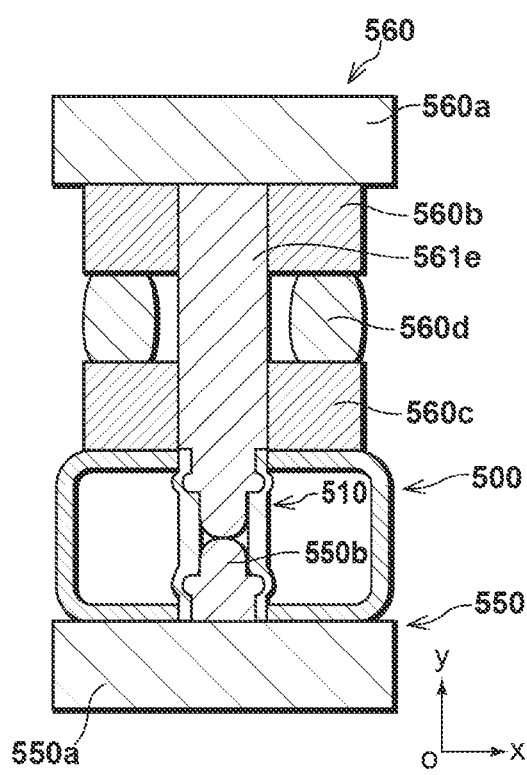

In the above state, by pressing the upper mold 560 against the lower mold 550 with a load f, the upper mold 560 presses the end portion 574 on the positive direction side of the y-axis of the preliminary molded member 570 at the upper end portion 561h of the punch 561e while compressing the elastic member 560d. This causes a stress of a wall portion of the preliminary molded member 570 to be increased in surroundings of a portion at which the end portion 561g of the larger-diameter portion of the punch 561e of the upper mold 560 and the inner end portion 576b of the large-diameter hole portion 574a of the preliminary molded member 570 are separated from each other. As a result, as indicated by an arrow M4 shown in FIG. 22, the wall portion of the preliminary molded member 570 is expanded, and as shown in FIGS. 18 and 19D, the convex portion 510b on the positive direction side of the y-axis is formed in addition to the convex portion 510a on the negative direction side of the y-axis. Furthermore, at this time, the convex portion 510a and the convex portion 510b are brought into contact with the inner wall surface of the left wall portion 16 and the inner wall portion of the right wall portion 18, respectively.

Furthermore, after maintaining the pressing state for a predetermined time, by releasing the pressing state so that the upper mold 560 is raised from the lower mold 550, the collar 510 is formed, and at the same time, the convex portion 510a and the convex portion 510b are brought into contact with the inner wall portion of the left wall portion 16 and the inner wall portion of the right wall portion 18, respectively, by which the collar 510 is fixed to the pedal arm 500.

As described above, according to the configuration of the present embodiment, because the collar further includes the second convex portion having the diameter expanded in the radial direction thereof by the deformation of the collar, and the collar is prevented from dropping out and fixed to the third wall portion and the fourth wall portion with the first convex portion and the second convex portion, even when a distance between the third wall portion and the fourth wall portion is wide, it is possible to provide the pedal arm with a simplified structure in which the collar is fixed to the pedal arm in a secured manner without using welding.

Sixth Embodiment

Next, a pedal arm of a sixth embodiment according to the present invention is described below in detail with reference mainly to FIGS. 23 to 26.

Figure 23:
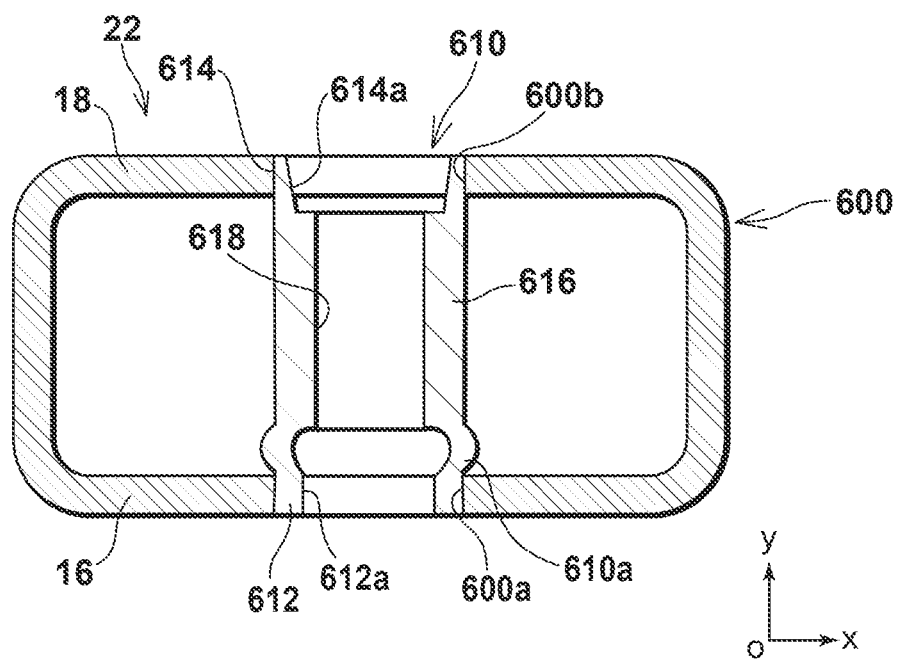
FIG. 23 is an enlarged cross-sectional view of a pedal arm of a sixth embodiment according to the present invention, which positionally corresponds to FIG. 17A.
Figure 24:
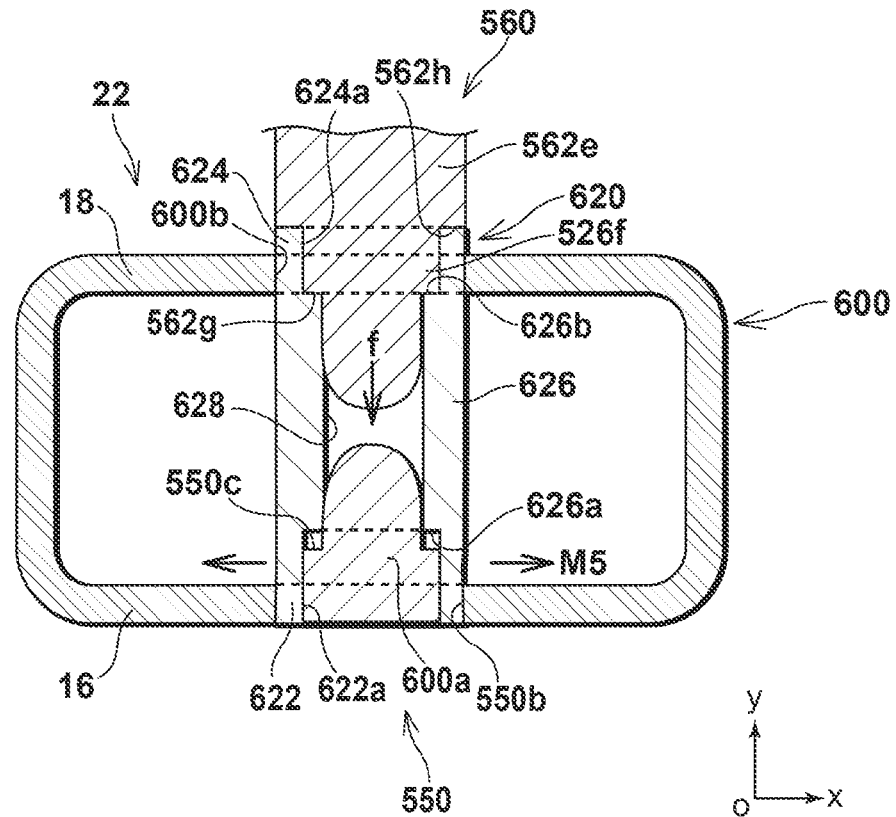
FIG. 24 is an enlarged cross-sectional view showing a process of forming a collar of the pedal arm of the present embodiment, which corresponds to FIG. 20 in its processing order.
Figure 25:
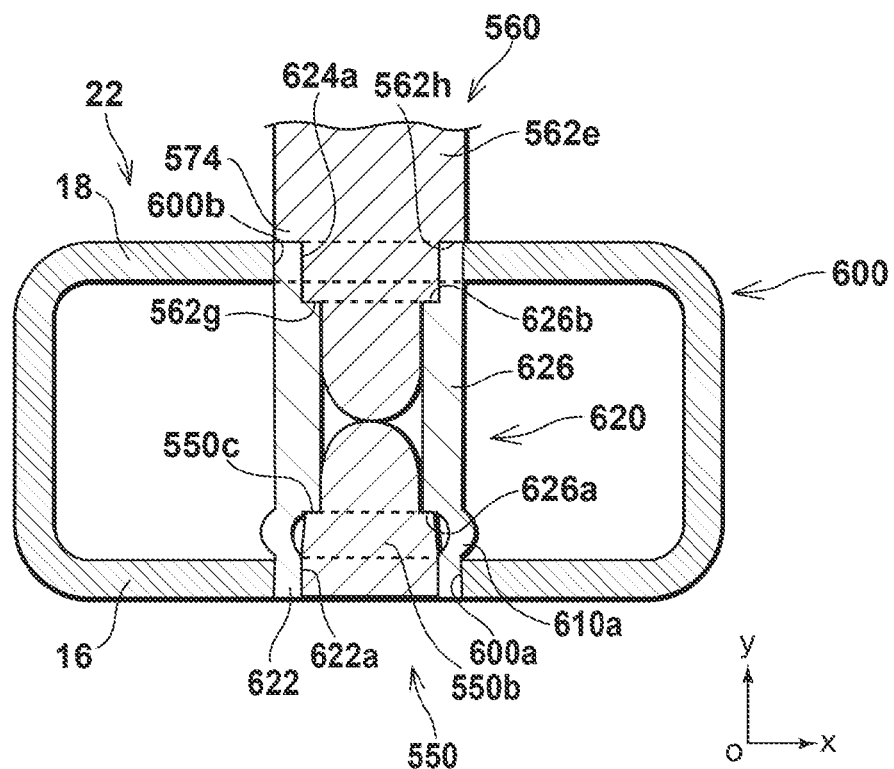
FIG. 25 is an enlarged cross-sectional view showing a process of forming the collar of the pedal arm of the present embodiment, which corresponds to FIG. 21 in its processing order.
Figure 26:
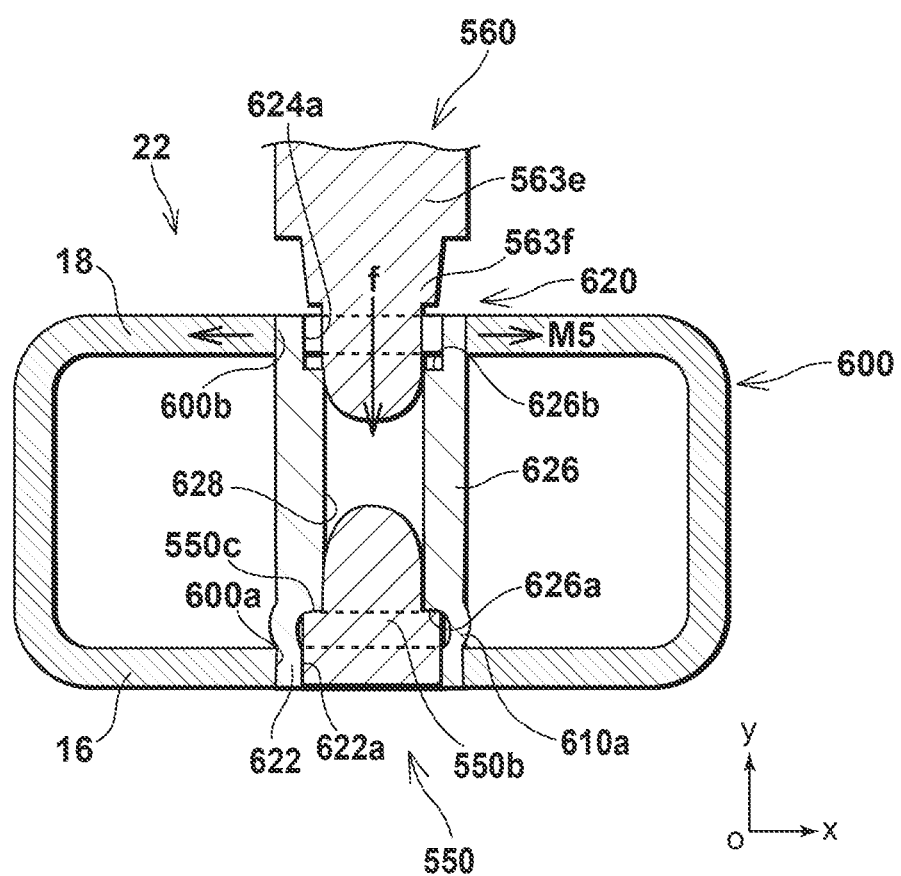
FIG. 26 is an enlarged cross-sectional view showing a process of forming the collar of the pedal arm of the present embodiment, which corresponds to FIG. 22 in its processing order.

FIG. 23 is an enlarged cross-sectional view of a pedal arm of the present embodiment, which positionally corresponds to FIG. 17A. FIG. 24 is an enlarged cross-sectional view showing a process of forming a collar of the pedal arm of the present embodiment, which corresponds to FIG. 20 in its processing order. FIG. 25 is an enlarged cross-sectional view showing a process of forming the collar of the pedal arm of the present embodiment, which corresponds to FIG. 21 in its processing order. FIG. 26 is an enlarged cross-sectional view showing a process of forming the collar of the pedal arm of the present embodiment, which corresponds to FIG. 22 in its processing order.

The pedal arm 600 according to the sixth embodiment is different from the pedal arm 500 according to the fifth embodiment in that a collar 610 includes a tapered portion 614b that is a pressing portion on an end portion 614 on the positive direction side of the y-axis, while other configurations of the sixth embodiment are identical to those of the fifth embodiment. Therefore, in the present embodiment, descriptions will be given focusing on such differences, and like component parts bears the same reference numerals to suitably simplify or omit descriptions thereof.

As shown in FIG. 23, the collar 610 of the pedal arm 600 includes a tubular-shaped main body 616 having an end portion 612 on the negative direction side of the y-axis and an end portion 614 on the positive direction side of the y-axis at an upper end portion 22 of the pedal arm 600. The main body 616 includes a through hole 618 that passes through the inside through in the y-axis direction, a convex portion 610a that protrudes in a radial direction perpendicular to the y-axis, and the tapered portion 614a that is a pressing portion that presses in the radial direction.

Here, because the collar 610 includes the convex portion 610a that protrudes in the radial direction on the negative direction side of the y-axis of the main body 616 and the tapered portion 614a that is a pressing portion that presses a portion of a hole 600b of a right wall portion 18 at an end portion 624 on the positive direction side of the y-axis of the main body 616, by pressing the tapered portion 614a against the portion of the hole 600b of the right wall portion 18 while bringing the convex portion 610a into contact with an inner wall surface of the left wall portion 16, the collar 610 can be prevented from dropping out of a hole 600a of the left wall portion 16 and the hole 600b of the right wall portion 18 and fixed to the pedal arm 600. This structure can be applied regardless of a distance between the left wall portion 16 and the right wall portion 18 by appropriately setting a distance between the convex portion 610a and the tapered portion 614a.

In order to fix the collar 610 having the above structure to the pedal arm 600, as shown in FIG. 24, a tubular-shaped preliminary molded member 620 is accommodate and held between a lower mold 550 and an upper mold 560, and the upper mold 560 is pressed against the lower mold 550 with a load f.

Although the lower mold 550 is the same as that in the fifth embodiment and the upper mold 560 is the same as that in the fifth embodiment, a punch 562e does not interfere with a tapered large-diameter hole portion 624a of the end portion 624 on the positive direction side of the y-axis of the preliminary molded member 620.

The preliminary molded member 620 includes an end portion 622 having a large-diameter hole portion 622a on the negative direction side of the y-axis, the end portion 624 having the tapered large-diameter hole portion 624a with a diameter expanding toward the positive direction of the y-axis on the positive direction side of the y-axis, and a main body 626 having a through hole 628 therein. In a state where the preliminary molded member 620 is accommodated and held between the lower mold 550 and the upper mold 560, a large-diameter portion of a punch 550b of the lower mold 550 is inserted into the large-diameter hole portion 622a of the preliminary molded member 620, and at the same time, an end portion 550c of the large-diameter portion and an inner end portion 626a of the large-diameter hole portion 622a of the preliminary molded member 620 are put in a state where they are separated from each other while inserting a small-diameter portion at the tip of the punch 550b into the through hole 628 of the preliminary molded member 620, and a large-diameter portion of a punch 563e of the upper mold 560 is inserted into the large-diameter hole portion 624a of the preliminary molded member 620 without an interference, and at the same time, an end portion 562g of the large-diameter portion and an inner end portion 626b of the large-diameter hole portion 624a of the preliminary molded member 620 are put in a state where they are brought into contact with each other while inserting a small-diameter portion at the tip of the punch 563e into the through hole 628 of the preliminary molded member 620.

In the above state, by pressing the upper mold 560 against the lower mold 550 with a load f, the upper mold 560 presses the inner end portion 626b of the large-diameter hole portion 624a of the preliminary molded member 620 at the end portion 562g of the punch 562e, and at the same time, presses the end portion 624 on the positive direction side of the y-axis of the preliminary molded member 620 at an upper end portion 562h of the punch 562e. This causes a stress of a wall portion of the preliminary molded member 620 to be increased in surroundings of a portion at which the end portion 550c of the larger-diameter portion of the punch 550b of the lower mold 550 and the inner end portion 626a of the large-diameter hole portion 622a of the preliminary molded member 620 are separated from each other. As a result, as indicated by an arrow M5 shown in FIG. 24, the wall portion of the preliminary molded member 620 is expanded, and as shown in FIG. 25, the end portion 550c of the larger-diameter portion of the punch 550b of the lower mold 550 and the inner end portion 626a of the large-diameter hole portion 622a of the preliminary molded member 620 are put in a state where they are brought into contact with each other, and the convex portion 610a on the negative direction side of the y-axis is formed on the preliminary molded member 620.

After maintaining the pressing state for a predetermined time, the pressing state is released and the upper mold 560 is raised from the lower mold 550 to replace the punch 562e of the upper mold 560 with another punch 563e, and as shown in FIG. 26, the upper mold 560 is pressed against the lower mold 550 again with a load f while accommodating and holding the preliminary molded member 620 on which the convex portion 610a is formed between the lower mold 550 and the upper mold 560.

The large-diameter portion of the punch 563e of the upper mold 560 includes a tapered portion 563f that is formed in a tapered shape with a diameter expanding toward the positive direction of the y-axis, which is larger than the larger-diameter hole portion 624a of the preliminary molded member 620.

While maintaining the end portion 550c of the larger-diameter portion of the punch 550b of the lower mold 550 and the inner end portion 626a of the large-diameter hole portion 622a of the preliminary molded member 620 in the state where they are brought into contact with each other, a large-diameter portion of the punch 563e of the upper mold 560 is inserted into the large-diameter hole portion 624a of the preliminary molded member 620, and at the same time, an outer wall surface of the tapered portion 563f of the large-diameter portion is pressed against an inner wall portion of the large-diameter hole portion 624a of the preliminary molded member 620 while inserting a small-diameter portion at the tip of the punch 563e into the through hole 628 of the preliminary molded member 620.

In the above state, if the upper mold 560 is kept being pressed against the lower mold 550, because the upper mold 560 keeps on pressing the inner wall surface of the large-diameter hole portion 624a of the preliminary molded member 620 at the tapered portion 563f of the larger-diameter portion of the punch 563e, as indicated by an arrow M5 shown in FIG. 26, the inner wall surface of the large-diameter hole portion 624a of the preliminary molded member 620 is expanded, and as shown in FIG. 23, the tapered portion 614a on the positive direction side of the y-axis is formed in addition to the convex portion 610a on the negative direction side of the y-axis. Furthermore, at this time, the convex portion 510a is brought into contact with the inner wall surface of the left wall portion 16 corresponding to the convex portion 510a, and the tapered portion 614a serves as a pressing portion that presses the portion of the hole 600b of the right wall portion 18.

Subsequently, after maintaining the pressing state for a predetermined time, by releasing the pressing state so that the upper mold 560 is raised from the lower mold 550, the collar 610 is formed, and at the same time, the convex portion 610a is brought into contact with the inner wall portion of the left wall portion 16, and the tapered portion 614a presses the portion of the hole 600b of the right wall portion 18, by which the collar 610 is fixed to the pedal arm 600.

Because the convex portion 610a is brought into contact with the inner wall surface of the left wall portion 16, the collar 610 is prevented from dropping out in the negative direction of the y-axis and fixed, and at the same time, because the tapered portion 614a presses the portion of the hole 600b of the right wall portion 18, the collar 610 is prevented from dropping out in the positive direction of the y-axis while being pressed in the radial direction and fixed.

As described above, according to the configuration of the present embodiment, because the collar further includes the pressing portion at which the collar is pressed in the radial direction thereof, and, the collar is prevented from dropping out and fixed while being pressed on the third wall portion and the fourth wall portion by using the first convex portion and the pressing portion, even when a distance between the third wall portion and the fourth wall portion is wide, it is possible to provide the pedal arm with a simplified structure in which the collar is fixed to the pedal arm in a secured manner without using welding. It is noted that the rear wall portion 12, the front wall portion 14, the left wall portion 16, and the right wall portion 18 correspond to the first wall portion, the second wall portion, the third wall portion, and the fourth wall portion, respectively.

Although the pedal arm in each of the above respective embodiments has been explained with a brake pedal arm as an example, it is matter of course that it can be widely applied to an arm-shaped operating member in a moving body such as a vehicle.

Furthermore, it is matter of course that the collars of the pedal arms according to the fourth to sixth embodiments can be applied not only to the pedal arm according to the first embodiment but also to the pedal arms according to the second and third embodiments.

Further, it is matter of course that the collars of the pedal arms according to the fourth to sixth embodiments are not limited to those to which the pushrod for operating the hydraulic system of the brake is coupled but can be applied to a collar of a shaft member and the like. In addition, it is matter of course that the collar can be widely applied to an operating member that is a hollow arm member including a pair of opposing wall portions, such as a tubular-shaped member or a box-shaped member of a moving body such as a vehicle.

As described above, according to the present invention, there can be provided a pedal arm with a simplified structure with which it is possible to maintain high shape accuracy in a stable manner at the time of mass production of the pedal arm while ensuring its strength in a necessary and sufficient manner and enhancing designing flexibility of its shape to have general-purpose and universal character based on which it is expected to have wide applications to pedal arms of moving object such as vehicles.

Reference is hereby made to a Patent Application No. TOKUGAN 2010-97337 with a filing date of Apr. 20, 2010 in Japan, the entire content of which is incorporated herein by reference.

The present invention is not limited to the embodiments described above in respect of a kind, placement and the number of the component parts and it is of course to be understood that the relevant component parts may be suitably replaced by those having equivalent advantageous effects and alterations may be suitably made without departing from the scope of the present invention, in light of the teachings. The scope of the invention is defined with reference to the following claims.

What is claimed is:
1. A pedal arm comprising:
an arm main body that is a tubular-shaped member formed by bending a plate member having a first end portion and a second end portion;
a pedal pad portion provided on the arm main body; and
a shaft portion provided on the arm main body,
wherein the arm main body includes a first wall portion and a second wall portion facing each other in a first direction, and a third wall portion and a fourth wall portion facing each other in a second direction that is different from the first direction,
wherein one of the first wall portion and the second wall portion includes an abutting portion which extends along an extending direction of the arm main body and at which the first end portion and the second end portion of the plate member are brought into contact with each other across an upper end portion and a lower end portion of the arm main body to define the tubular-shaped member, and the third wall portion and the fourth wall portion correspondingly include a first curved portion and a second curved portion, which are curved in parallel to each other with a same curvature along the extending direction of the arm main body,
wherein a first depressed wall portion and a second depressed wall portion are correspondingly formed on the first curved portion and the second curved portion, which are formed in inward convex shapes, respectively, and at least parts of the first depressed wall portion and the second depressed wall portion are brought into contact with each other,
wherein the first depressed wall portion includes a flat portion that extends to form the first curved portion in a middle of the first depressed wall portion, and the second depressed wall portion includes a flat portion that extends to form the second curved portion in a middle of the second depressed wall portion, and
wherein the first depressed wall portion and the second depressed wall portion include respective bead portions disposed in a middle of the respective flat portions, and the first depressed wall portion and the second depressed wall portion are brought into contact with each other at the respective bead portions.

2. The pedal arm according to claim 1, wherein a bottom wall portion of the first depressed wall portion and a bottom wall portion of the second depressed wall portion are entirely brought into contact with each other.

3. The pedal arm according to claim 1, wherein the third wall portion and the fourth wall portion further correspondingly includes a third curved portion and a fourth curved portion that curve in parallel to each other with a same curvature in a direction opposite to a direction in which the first curved portion and the second curved portion curve along the extending direction of the arm main body, and wherein a third depressed wall portion and a fourth depressed wall portion are formed on the third curved portion and the fourth curved portion, which are formed in inward convex shapes, respectively, and at least parts of the third depressed wall portion and the fourth depressed wall portion are brought into contact with each other.

4. The pedal arm according to claim 1, further comprising a collar, wherein the collar includes a first convex portion having a diameter expanded in a radial direction thereof by a deformation of the collar, and the collar is fixed to the arm main body with the first convex portion.

5. The pedal arm according to claim 4, wherein the collar further includes a pair of flange portions, and the collar is fixed to the third wall portion and the fourth wall portion with the first convex portion and the pair of flange portions.

6. The pedal arm according to claim 4, wherein the collar further includes a second convex portion having a diameter expanded in the radial direction thereof by a deformation of the collar, and the collar is fixed to the third wall portion and the fourth wall portion with the first convex portion and the second convex portion.

7. The pedal arm according to claim 4, wherein the collar further includes a pressing portion at which the collar is pressed in the radial direction thereof, and the collar is fixed to the third wall portion and the fourth wall portion with the first convex portion and the pressing portion.

\* \* \* \* \*